United States Patent
Balakrishnan et al.

(10) Patent No.: US 7,693,222 B2
(45) Date of Patent: *Apr. 6, 2010

(54) METHOD AND SYSTEM FOR RE-MULTIPLEXING OF CONTENT-MODIFIED MPEG-2 TRANSPORT STREAMS USING PCR INTERPOLATION

(75) Inventors: Jeyendran Balakrishnan, San Jose, CA (US); Hemant Malhotra, Fremont, CA (US)

(73) Assignee: Ericsson Television Inc., Duluth, GA (US)

(*) Notice: Subject to any disclaimer, the term of this patent is extended or adjusted under 35 U.S.C. 154(b) by 1311 days.

This patent is subject to a terminal disclaimer.

(21) Appl. No.: 10/640,871

(22) Filed: Aug. 13, 2003

(65) Prior Publication Data

US 2005/0039064 A1    Feb. 17, 2005

(51) Int. Cl.
 H04N 7/12 (2006.01)
 H04N 11/02 (2006.01)
 H04N 11/04 (2006.01)
(52) U.S. Cl. .............................. 375/240.28
(58) Field of Classification Search ............. 375/240.26
 See application file for complete search history.

(56) References Cited

U.S. PATENT DOCUMENTS

| | | |
|---|---|---|
| 3,692,942 A | 9/1972 | Inose et al. |
| 4,748,618 A | 5/1988 | Brown et al. |
| 4,920,534 A | 4/1990 | Adelmann et al. |
| 4,970,590 A | 11/1990 | Cucchi et al. |
| 5,231,486 A | 7/1993 | Acampora et al. |
| 5,287,178 A | 2/1994 | Acampora et al. |
| 5,287,182 A | 2/1994 | Haskell et al. |
| 5,289,276 A | 2/1994 | Siracusa et al. |

(Continued)

FOREIGN PATENT DOCUMENTS

GB    2315649    4/1998

(Continued)

OTHER PUBLICATIONS

Haskell, Barry G., et al. "Digital Video: An Introduction to MPEG-2," Chapters 2, 3 and 7, pp. 14-31, 32-54, and 146-155, 1997.

(Continued)

Primary Examiner—Mehrdad Dastouri
Assistant Examiner—Jeremaiah C Huber
(74) Attorney, Agent, or Firm—Evan L. Kahn; Proskauer Rose LLP

(57) ABSTRACT

A system and method is provided for revising the time stamp information in an MPEG-2 transport stream after content in the transport stream is modified. According to one method, successive PCR time stamps previously added to the transport stream are used to determine $PCR_{SYNC}$ time stamps for synchronization points in the transport stream by interpolation. The $PCR_{SYNC}$ time stamps are substituted into transport packets within the transport stream. The $PCR_{SYNC}$ is also used to determine modified time of arrival (TOA) stamps to be added to transport packets. According to a second method, PCR interpolation is used to determine the values of $PCR_{SYNC}$. TOA interpolation of TOA stamps previously added to the transport stream are used to determine modified TOA stamps to be substituted into the transport stream for the previously added TOA stamps.

16 Claims, 9 Drawing Sheets

U.S. PATENT DOCUMENTS

| | | | |
|---|---|---|---|
| 5,333,135 A | 7/1994 | Wendorf | |
| 5,361,097 A | 11/1994 | Kolczynski | |
| 5,365,272 A | 11/1994 | Siracusa | |
| 5,371,547 A | 12/1994 | Siracusa et al. | |
| 5,381,181 A | 1/1995 | Deiss | |
| 5,396,492 A | 3/1995 | Lien | |
| 5,396,497 A | 3/1995 | Veltman | |
| 5,400,401 A | 3/1995 | Wasilewski | |
| 5,410,355 A | 4/1995 | Kolczynski | |
| 5,418,782 A | 5/1995 | Wasilewski | |
| 5,420,866 A | 5/1995 | Wasilewski | |
| 5,426,464 A | 6/1995 | Casavant et al. | |
| 5,430,485 A | 7/1995 | Lankford et al. | |
| 5,448,568 A | 9/1995 | Delpuch et al. | |
| 5,457,701 A | 10/1995 | Wasilewski et al. | |
| 5,457,780 A | 10/1995 | Shaw et al. | |
| 5,459,789 A | 10/1995 | Tamer et al. | |
| 5,467,139 A | 11/1995 | Lankford | |
| 5,473,601 A | 12/1995 | Rosen et al. | |
| 5,473,609 A | 12/1995 | Chaney | |
| 5,475,688 A | 12/1995 | Bridgewater et al. | |
| 5,475,754 A | 12/1995 | Bridgewater et al. | |
| 5,477,236 A | 12/1995 | Nanbu | |
| 5,483,287 A | 1/1996 | Siracusa | |
| 5,486,864 A | 1/1996 | Zdepski | |
| 5,489,947 A | 2/1996 | Cooper | |
| 5,510,845 A | 4/1996 | Yang et al. | |
| 5,515,106 A | 5/1996 | Chaney et al. | |
| 5,517,250 A | 5/1996 | Hoogenboom et al. | |
| 5,521,979 A | 5/1996 | Deiss | |
| 5,534,914 A | 7/1996 | Flohr et al. | |
| 5,535,209 A | 7/1996 | Glaser et al. | |
| 5,537,408 A | 7/1996 | Branstad et al. | |
| 5,539,920 A | 7/1996 | Menand et al. | |
| 5,544,161 A | 8/1996 | Bigham et al. | |
| 5,548,532 A | 8/1996 | Menand et al. | |
| 5,559,999 A | 9/1996 | Maturi et al. | |
| 5,561,791 A | 10/1996 | Mendelson et al. | |
| 5,563,648 A | 10/1996 | Menand et al. | |
| 5,565,923 A | 10/1996 | Zdepski | |
| 5,566,174 A | 10/1996 | Sato et al. | |
| 5,566,208 A | 10/1996 | Balakrishnan | |
| 5,568,403 A | 10/1996 | Deiss et al. | |
| 5,570,335 A | 10/1996 | Ogata et al. | |
| 5,574,505 A | 11/1996 | Lyons et al. | |
| 5,579,317 A | 11/1996 | Pang et al. | |
| 5,588,025 A | 12/1996 | Strolle et al. | |
| 5,596,581 A | 1/1997 | Saeijs et al. | |
| 5,598,415 A | 1/1997 | Nuber et al. | |
| 5,603,058 A | 2/1997 | Belknap et al. | |
| 5,606,539 A | 2/1997 | De Haan et al. | |
| 5,608,697 A | 3/1997 | De Haan et al. | |
| 5,617,146 A | 4/1997 | Duffield et al. | |
| 5,619,501 A | 4/1997 | Tamer et al. | |
| 5,621,463 A | 4/1997 | Lyons et al. | |
| 5,640,388 A | 6/1997 | Woodhead et al. | |
| 5,650,825 A | 7/1997 | Naimpally et al. | |
| 5,652,627 A | 7/1997 | Allen | |
| 5,675,732 A | 10/1997 | Majeti et al. | |
| 5,691,986 A | 11/1997 | Pearlstein | |
| 5,703,877 A | 12/1997 | Nuber et al. | |
| 5,742,599 A | 4/1998 | Lin et al. | |
| 5,742,623 A | 4/1998 | Nuber et al. | |
| 5,754,783 A | 5/1998 | Mendelson et al. | |
| 5,784,110 A | 7/1998 | Acampora et al. | |
| 5,790,176 A | 8/1998 | Craig | |
| 5,790,543 A | 8/1998 | Cloutier | |
| 5,793,425 A | 8/1998 | Balakrishnan | |
| 5,796,743 A | 8/1998 | Bunting et al. | |
| 5,801,781 A | 9/1998 | Hiroshima et al. | 348/441 |
| 5,812,529 A | 9/1998 | Czarnik | |
| 5,835,493 A | 11/1998 | Magee et al. | |
| 5,835,668 A | 11/1998 | Yanagihara | |
| 5,835,843 A | 11/1998 | Haddad | |
| 5,844,867 A | 12/1998 | De Haan et al. | |
| 5,859,660 A | 1/1999 | Perkins et al. | |
| 5,877,812 A | 3/1999 | Krause et al. | |
| 5,905,732 A | 5/1999 | Fimoff et al. | |
| 5,914,962 A | 6/1999 | Fimoff et al. | |
| 5,917,830 A | 6/1999 | Chen et al. | |
| 5,946,318 A | 8/1999 | Post | |
| 5,956,088 A | 9/1999 | Shen et al. | |
| 5,978,542 A | 11/1999 | Ting et al. | |
| 5,991,912 A | 11/1999 | Mao | |
| 5,995,726 A | 11/1999 | Dillon | |
| 6,002,687 A | 12/1999 | Magee et al. | |
| 6,038,000 A | 3/2000 | Hurst, Jr. | |
| 6,044,396 A | 3/2000 | Adams | |
| 6,049,551 A | 4/2000 | Hinderks et al. | |
| 6,052,384 A | 4/2000 | Huang et al. | |
| 6,058,109 A | 5/2000 | Lechleider | |
| 6,078,958 A | 6/2000 | Echeta et al. | |
| 6,111,896 A | 8/2000 | Slattery et al. | |
| 6,163,316 A | 12/2000 | Killian | |
| 6,167,084 A | 12/2000 | Wang et al. | |
| 6,181,712 B1 | 1/2001 | Rosengren | |
| 6,205,473 B1 | 3/2001 | Thomasson et al. | |
| 6,246,701 B1 | 6/2001 | Slatter | |
| 6,252,873 B1 | 6/2001 | Vines | |
| 6,292,490 B1 | 9/2001 | Gratacap et al. | |
| 6,330,286 B1 | 12/2001 | Lyons et al. | |
| 6,351,471 B1 | 2/2002 | Robinett et al. | |
| 6,470,049 B1 | 10/2002 | Nguyen | |
| 6,516,002 B1 | 2/2003 | Huang et al. | |
| 6,639,943 B1 | 10/2003 | Radha et al. | |
| 6,654,421 B2 | 11/2003 | Hanamura et al. | 375/240.26 |
| 6,744,785 B2 | 6/2004 | Robinett et al. | |
| 6,806,909 B1 | 10/2004 | Radha et al. | |
| 6,819,865 B2 | 11/2004 | Ando et al. | |
| 6,831,892 B2 | 12/2004 | Robinett et al. | |
| 6,868,125 B2 * | 3/2005 | Gendel | 375/240.26 |
| 6,988,238 B1 * | 1/2006 | Kovacevic et al. | 714/799 |
| 7,082,573 B2 | 7/2006 | Apparao et al. | |
| 7,088,725 B1 * | 8/2006 | Kato | 370/395.64 |
| 2001/0033619 A1 | 10/2001 | Hanamura et al. | |
| 2003/0002587 A1 | 1/2003 | Nguyen | |
| 2003/0043924 A1 | 3/2003 | Haddad et al. | |

FOREIGN PATENT DOCUMENTS

| | | |
|---|---|---|
| WO | WO-97-19560 | 5/1997 |
| WO | WO/2005/019999 | 12/2004 |
| WO | WO/2005/020558 | 12/2004 |
| WO | WO/2005/020559 | 12/2004 |
| WO | WO/2005/020557 | 3/2005 |

OTHER PUBLICATIONS

Information Technology—Generic Coding of Moving Pictures and Associated Audio: Systems ISO/IEC 13818-1, Dec. 1, 2000.

Information Technology—Generic Coding of Moving Pictures and Associated Audio: Video ISO/IEC 13818-2, May 15, 1996.

Wasilewski, Anthony J., "MPEG-2 Systems Specification: Blueprint for Network Interoperability," Communications Technology, Feb. 1994.

Legall, Didier, "MPEG: A Video Compression Standard for Multimedia Applications," Communication of the ACM, Apr. 1991, vol. 34, No. 4.

Information Technology—Generic Coding of Moving Pictures and Associated Audio: Systems Recommendation H.222.o, ISO/IEC 13818-1, Apr. 15, 1996.

* cited by examiner

METHOD AND SYSTEM FOR RE-MULTIPLEXING OF CONTENT-MODIFIED MPEG-2 TRANSPORT STREAMS USING PCR INTERPOLATION

RELATED APPLICATIONS (1) U.S. patent application Ser. No. 10/640,872, filed concurrently herewith for Jeyendran Balakrishnan and Shu Xiao and entitled Method And System For Modeling The Relationship Of The Bit Rate Of A Transport Stream And The Bit Rate Of An Elementary Stream Carried Therein, and which has issued as U.S. Pat. No. 7,342,968;

(2) U.S. patent application Ser. No. 10/641,322, filed concurrently herewith for Jeyendran Balakrishnan and Shu Xiao and entitled Model And Model Update Technique In A System For Modeling The Relationship Of The Bit Rate Of A Transport Stream And The Bit Rate Of An Elementary Stream Carried Therein, and which has issued as U.S. Pat. No. 7,274,742;

(3) U.S. patent application Ser. No. 10/641,323, filed concurrently herewith for Jeyendran Balakrishnan and Hemant Malhotra and entitled Method and System for Time-Synchronized Forwarding of Ancillary Information in Stream Processed MPEG-2 Systems Streams, now abandoned; and (4) U.S. patent application Ser. No. 10/640,866, filed concurrently herewith for Jeyendran Balakrishnan and Hemant Malhotra and entitled Method and System for Re-multiplexing of Content Modified MPEG-2 Transport Streams using Interpolation of Packet Arrival Times, and which has issued as U.S. Pat. No. 7,227,899.

The contents of the above-listed patent applications are incorporated herein by reference.

FIELD OF THE INVENTION

This invention relates to the modification of content present in one or more portions of a bit stream containing one or more programs, such as real-time audio-video programs, and remultiplexing modified and non-modified portions of the bit stream. The output stream is configured so as to enable identification, extraction and real-time reproduction of the various portions of the bit stream at the receiving end.

BACKGROUND OF THE INVENTION

This invention is described in the context of audio-video programs, which include at least one audio signal or one video signal. However, those of ordinary skill in the art will appreciate the applicability of this invention to other types of program signals.

The MPEG-2 Systems specification, ISO/IEC 13818-1, describes a standardized method and data format of packetizing and multiplexing compressed digital audio-visual information for serial transmission applications. This format is called the transport stream format and can be used to multiplex compressed data from one or more audio-visual programs into a single stream. It exhibits a hierarchical structure in which the compressed audio-visual data is present at the lower, compression level, and the packetization and multiplexing of this information is carried out at the higher, systems level. The raw compressed representation of one audio or video signal is referred to as an elementary stream (ES). Compression formats for elementary streams include—but are not restricted to—MPEG-1 Video (ISO/IEC 11172-2 and 11172:3), MPEG-2 Video (ISO/IEC 13818-2), MPEG-4 Video (Part 2 or 10), H.263++, H.26L and the draft H.264/MPEG-4 Part 10 for encoding video data, and MPEG-1 Audio, MPEG-2 Audio (ISO/IEC 13818-3), and MPEG-4 Audio and Dolby-AC-3 for encoding audio data.

The MPEG-2 PES and transport streams encapsulating MPEG-2 video will be used herein as a model for illustrating the invention. The MPEG-2 PES streams and transport streams will be used as a specific example of the systems layer. Those skilled in the art will appreciate that other types of elementary streams, such as encoded audio, MPEG-4 video, etc. may be encapsulated in the PES and transport streams rather than MPEG-2 video.

Audio-visual programs are obtained by using an appropriate combination of one or more elementary streams for storage or transmission of data. For example, one audio elementary stream and one video elementary stream may be combined, or one video elementary stream and multiple audio elementary streams may be combined. The transport stream format enables both single program transport streams (SPTS) in which the elementary streams of a single audio-visual program are multiplexed together into a serial stream, and multiple program transport streams (MPTS), in which the component elementary streams of multiple audio-visual programs are all multiplexed together into a single serial stream.

Referring to FIG. 1, to form a transport stream, each of N elementary streams 100 (including $ES_1$, $ES_2$, through $ES_N$) is first packetized into N packetized elementary streams of (PES) packets 110, independent of its underlying compression format. Each PES packet is comprised of a PES packet header and a segment of a single elementary stream as a payload, which contains data for only a single elementary stream. However, a PES packet may contain data for more than one decoding unit (e.g., data for more than one compressed picture or for more than one compressed audio frame). A variety of packetization strategies for forming PES packets from an elementary stream are permitted.

PES packets from each elementary stream are further packetized into fixed size (188 byte) transport stream (TS) packets 120. Each TS packet 120, as shown in FIG. 2, consists of a fixed 4 byte packet header 121, an optional adaptation field 122 of variable length, and the remaining bytes containing the PES packet data as payload 123. The fixed packet header 121 contains a field called Packet IDentifier (PID), which is a unique numeric identifier or tag for each elementary stream 100 carried in a transport stream 120. For example, one PID is assigned to a video ES of a particular program, a second, different PID is assigned to the audio ES of a particular program, etc.

TS packets 120 from multiple underlying elementary streams 100 are then multiplexed together according to the rules for transport streams set forth in the MPEG-2 Systems specification. This includes insertion of special TS packets 130 containing System Information (SI) which include tables specifying the different programs within the transport stream as well the PIDs which belong to each program. Thus, the transport stream format consists of a lower compression layer, comprising the component elementary streams, and a higher system layer, comprising the PES and TS packets.

The system layer contains important timing information which enables the receiver to play back the audio-visual information in a time-synchronized manner. This includes a Presentation Time Stamp (PTS) in the PES packet header which indicates the time instants at which the associated audio or video presentation unit (an audio or video frame) of a given audio-visual program should be decoded and presented to the user. This PTS is relative to the System Time Clock used by the transmitting encoder. The TS packets also carry samples of this encoder clock called Program Clock References (PCR) in a quasi-periodic manner to enable the receiver to synchronize its system time clock to that of the encoder. This enables the receiver to decompress and present the audio and video data at the correct times, thereby recreating the original presentation.

A requirement for MPEG-2 transport streams is that the PCR for each program must be sent at least once every 100 ms. In the case of the DVB extension (Specification of Service Information (SI) in DVB Systems, ETSI Standard EN 300 468, May 2000) to MPEG-2, these PCR packets are to be sent at least once every 40 ms. PCR information, along with other optional information, is carried in the TS packet inside the adaptation field 122. The PCRs for a given program can be carried in the TS packets carrying any one of the component elementary streams 100 of that program (as identified by its PID), or they can be carried in separate TS packets with a unique PCR PID. Typically, PCRs are carried in the video PID of a program.

In the MPEG-2 context, there are many applications that require one or more audio-visual programs carried inside a MPEG-2 transport stream to be modified at the elementary stream level, using stream processing devices. The prior art teaches a number of "stream processors" or devices, such as transcoders, editors and splicers, that process previously generated transport streams. A transcoder receives an already encoded elementary stream and re-encodes it, e.g., at a different bit rate, according to a different encoding standard, at a different resolution, using different encoding options, changing the audio sampling rate or video frame rate, etc. while maintaining the underlying content with as much fidelity as possible. A splicer is a device that appends one signal to another, inserts that signal in the middle of the first, or replaces part of the signal at a given instant. For example, a splicer may append one encoded elementary stream at the end of another elementary stream in a program so that they will be presented seamlessly and in sequence. Alternatively, the splicer could insert one program in the middle of another, e.g., in the case of inserting a commercial in the middle of a television show. An editor is a device that edits (modifies) an elementary stream and produces an edited encoded elementary stream. Examples of these devices are described in U.S. Pat. Nos. 6,141,447, 6,038,256, 6,094,457, 6,192,083, 6,005,621, 6,229,850, 6,310,915, and 5,859,660.

In such stream processing, the underlying bit positions of various parts of the elementary stream have been changed. For instance, video or audio transcoding tends to change the amount of information (number of bits) needed to represent each presentable portion of the video or audio. This is especially true for a transcoder that changes the bit rate of the output signal but is also true of a transcoder which, for example, re-encodes the elementary stream according to a different standard than it was originally prepared. Likewise, a splice or edit tends to change the relative location of two points (namely, the end point of the original encoded video signal portion that precedes the inserted elementary stream information and the beginning point of the original encoded video signal portion that follows the inserted elementary stream information) in the originally encoded video signal. Therefore, the modified elementary streams must be re-packetized and re-multiplexed into a syntax-compliant transport stream for serial transmission.

One of the critical requirements in transport stream output packetization and delivery is that the inherent information content in the outgoing elementary streams retain the same timing relationship as that of the input. This is required to enable the receiver to play back the underlying audio-visual presentation in a time-synchronized manner. Since the relationship between input and output elementary stream bits is invalidated by the process of stream processing, the output packetization process must somehow re-create the original timing relationship.

Existing approaches to this problem address this by using a full-fledged multiplexer at the output. This involves first recovering the original encoder clock for each modified program using clock recovery techniques like phase locked loops. Thereafter, the presentation times and decoding times of each outgoing audio or video frame are determined and re-stamped and inserted into the PES packets, and each outgoing TS packet is emitted in a manner that complies with the T-STD buffer model. Finally, PCR values are inserted into the emitted TS packets at the required frequency by looking up the recovered encoder clock at the instant of departure of the PCR-bearing TS packets. Since the timing information is completely regenerated and inserted, non-modified elementary streams in any processed program need to be de-packetized to their elementary stream levels, re-packetized, and re-transmitted. All these tasks, especially the need to obey T-STD buffer model requirements, impose a large implementation overhead, thereby increasing the complexity and cost of the stream processing system.

SUMMARY OF THE INVENTION

It is therefore an object of this invention to provide simplified methods for generating timing information to be included in a content-modified transport stream.

In accordance with a first embodiment of the invention, a system and method are described for re-multiplexing elementary streams that are modified by a stream processing system into a stream format compliant with a particular standard, such as an MPEG-2 transport stream format. The system may be implemented, for example, within a device such as a transcoder, splicer, or editor. Each incoming transport stream packet entering the system, whether or not it is to be modified, is stamped with its time of arrival (TOA) (e.g., with a local 27 MHz real-time clock), as well as its packet number in order of arrival within the full transport stream. Transport stream packets containing data to be modified are input to a stream processor, the stream processing algorithm is performed at the elementary stream level, and another sequence of transport stream packets are output.

Before outputting transport stream packets with modified data, a new set of PCR values are calculated for the output transport stream packets using PCR interpolation based on the PCR values in the transport stream packets in the input transport stream before the content modification. In particular, PCR values for pre-determined synchronization points are determined through the PCR interpolation and are inserted as the new PCR values into the content-modified transport stream packets. These new PCR values can then be used to synchronize the consumption/use of the information in the program output from the re-multiplexer. For example, a decoder receiving the modified transport stream uses PCR data to decode at least a portion of the modified transport stream.

In this first embodiment, the new PCR values for the synchronization points are used to calculate new TOA times for TS packets containing data that was modified. These TOA values are calculated using a function that relates the TOA values to the PCR time values. The new TOAs are then inserted in the packets when the packets are re-multiplexed into the transport stream.

The input TOA stamps of incoming TS packets that are not modified are left unchanged. With TOA stamps now available for all outgoing TS packets, whether modified or unmodified, the output multiplexer implements a simple algorithm which emits each outgoing TS packet after a constant delay past its corresponding arrival time stamp. Thus, a compliant MPEG-2 transport stream is delivered.

Another embodiment of the present invention is similar to the first embodiment except that the timing information, including PCR and TOA time stamps, for modified transport stream packets are independently calculated. Thus, new PCR times are calculated using PCR interpolation and new TOA times are calculated using TOA interpolation for synchronization points.

The advantage of the new system and method for re-multiplexing is that it has a significantly lower computational requirement than implementing a full-fledged re-multiplexer. Further, re-multiplexers using the invented method can operate with only TS packets as input, unlike conventional re-multiplexers that must accept PES packets as input. This allows simple re-multiplexing implementations that can be used for both modified and unmodified transport streams, enabling the implementation of a single re-multiplexing device that can forward audio-visual programs with or without stream modification into a compliant single or multi program MPEG-2 transport stream. A system or apparatus to carry out stream processing and re-multiplexing using the inventive method is also described.

BRIEF DESCRIPTION OF THE DRAWINGS

In the drawings, wherein like reference numerals denote similar elements through out the several views.

DETAILED DESCRIPTION OF THE PREFERRED EMBODIMENTS

Figure 1:
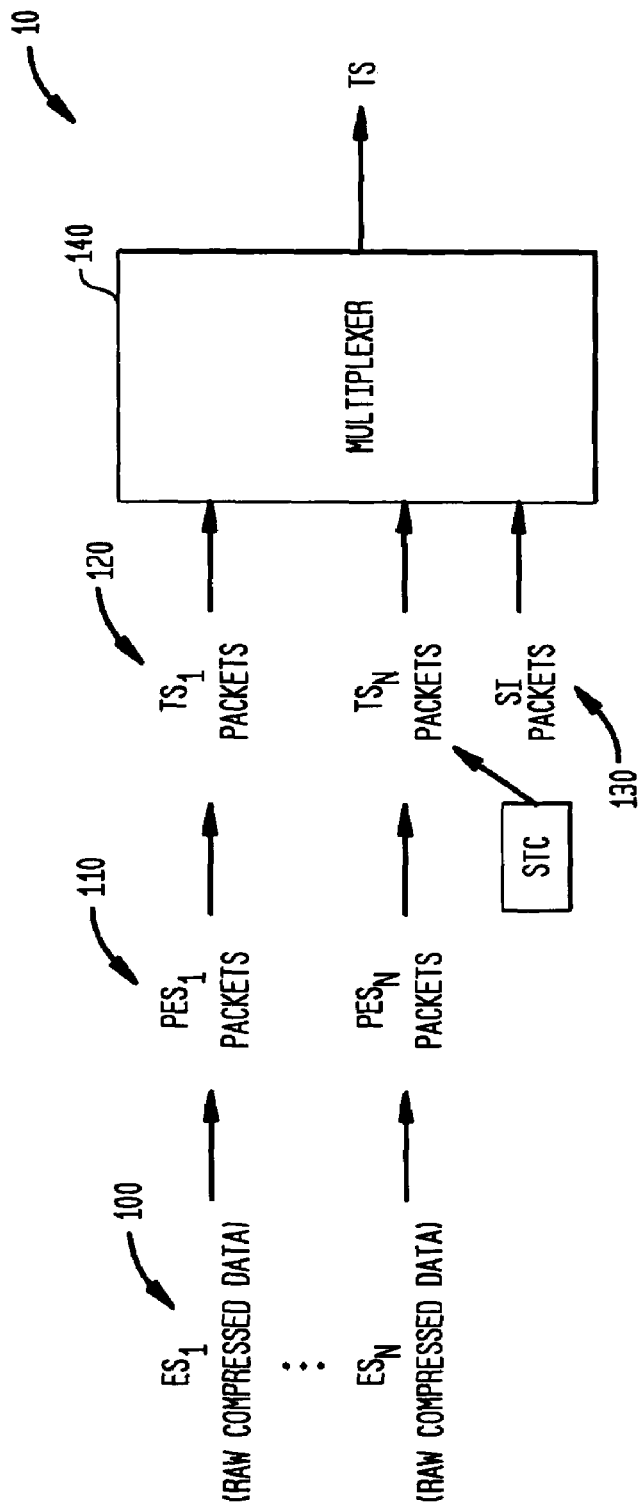
FIG. 1 is a schematic view of certain steps for processing raw compressed data into an MPEG-2 transport stream.
Figure 2:
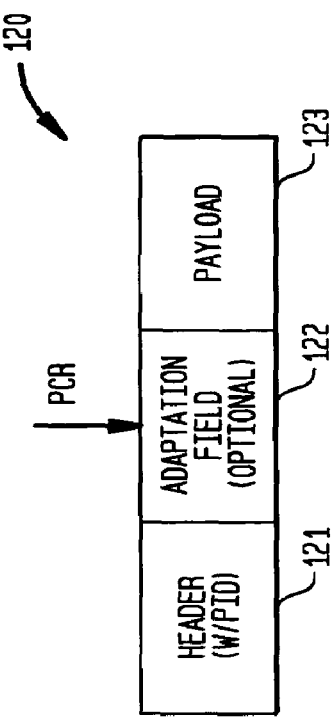
FIG. 2 is a representation of a packet in the transport stream of FIG. 1.
Figure 3:
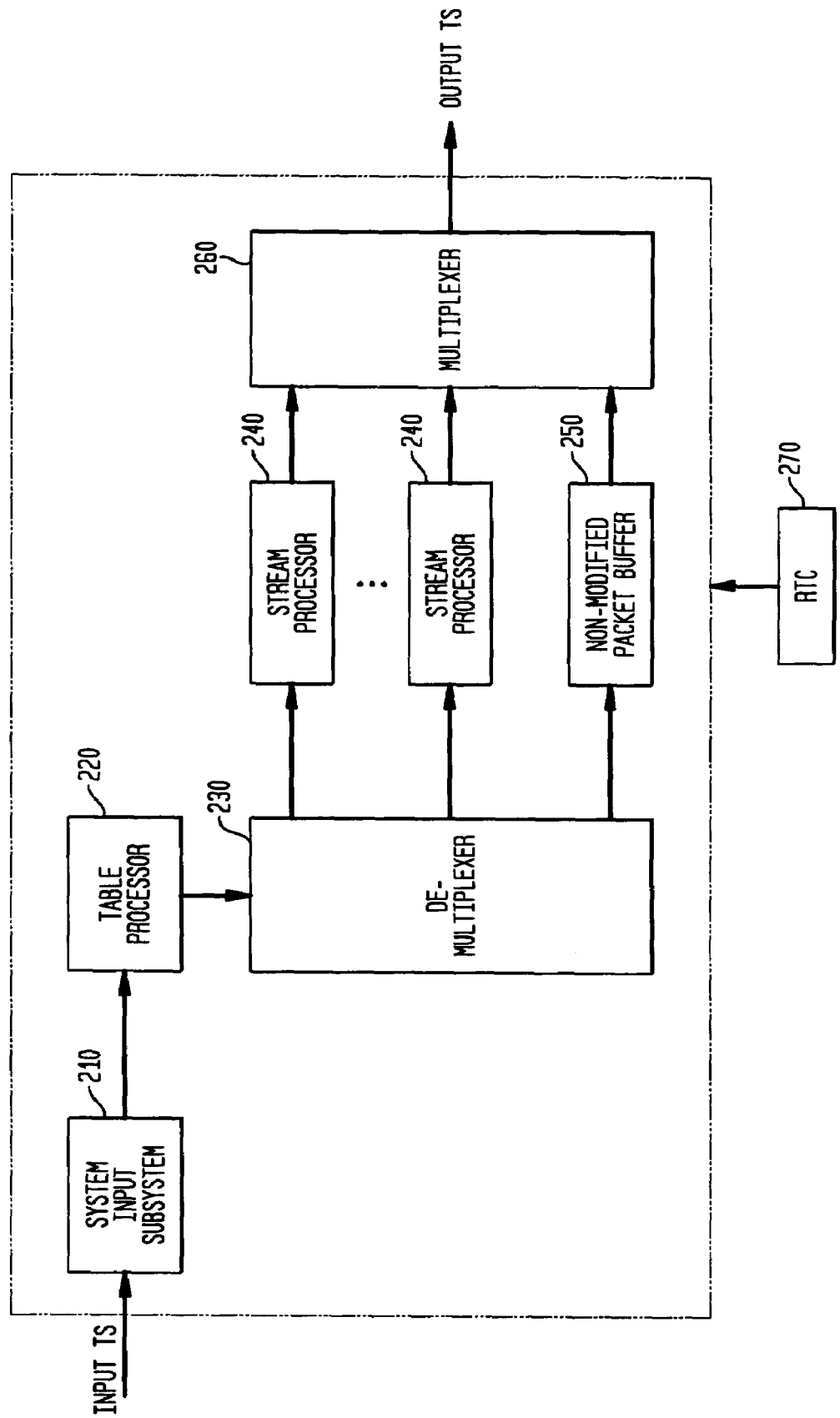
FIG. 3 is a block diagram of a system in accordance with an embodiment of the present invention for modifying the content of an incoming transport stream and remultiplexing the modified content into an outgoing transport stream.

FIG. 3 depicts an illustrative system 200 that, in accordance with the invention, accepts compliant MPEG-2 transport streams, processes one or more of the constituent elementary streams via corresponding stream processors, and multiplexes the results to deliver a compliant MPEG-2 transport stream. Illustratively, such a system may be implemented using a suitably programmed network of one or more Mediaplex-20™ or Source Media Routers™ available from SkyStream Networks Inc., a company located in Sunnyvale Calif. The basic architectures of these devices are described in U.S. patent application Ser. No. 10/159,787 and U.S. Pat. No. 6,351,474, respectively.

The illustrated system 200 functionally includes a system input subsystem 210, a table processor subsystem 220, a demultiplexer subsystem 230, one more stream processor subsystems 240 ("stream processors"), one or more packet buffers 250, and a multiplexer subsystem 260. Each stream processor 240, which modifies the content of a different elementary stream, is equipped with a PCR interpolation capability, which is explained below. The packet buffers 250 are used to buffer TS packets of elementary streams that are not to be modified, while other streams are being modified at the stream processors 240. Each of the subsystems may be contained in the same device or in one or more separate devices.

I. PCR Interpolation

Figure 4:
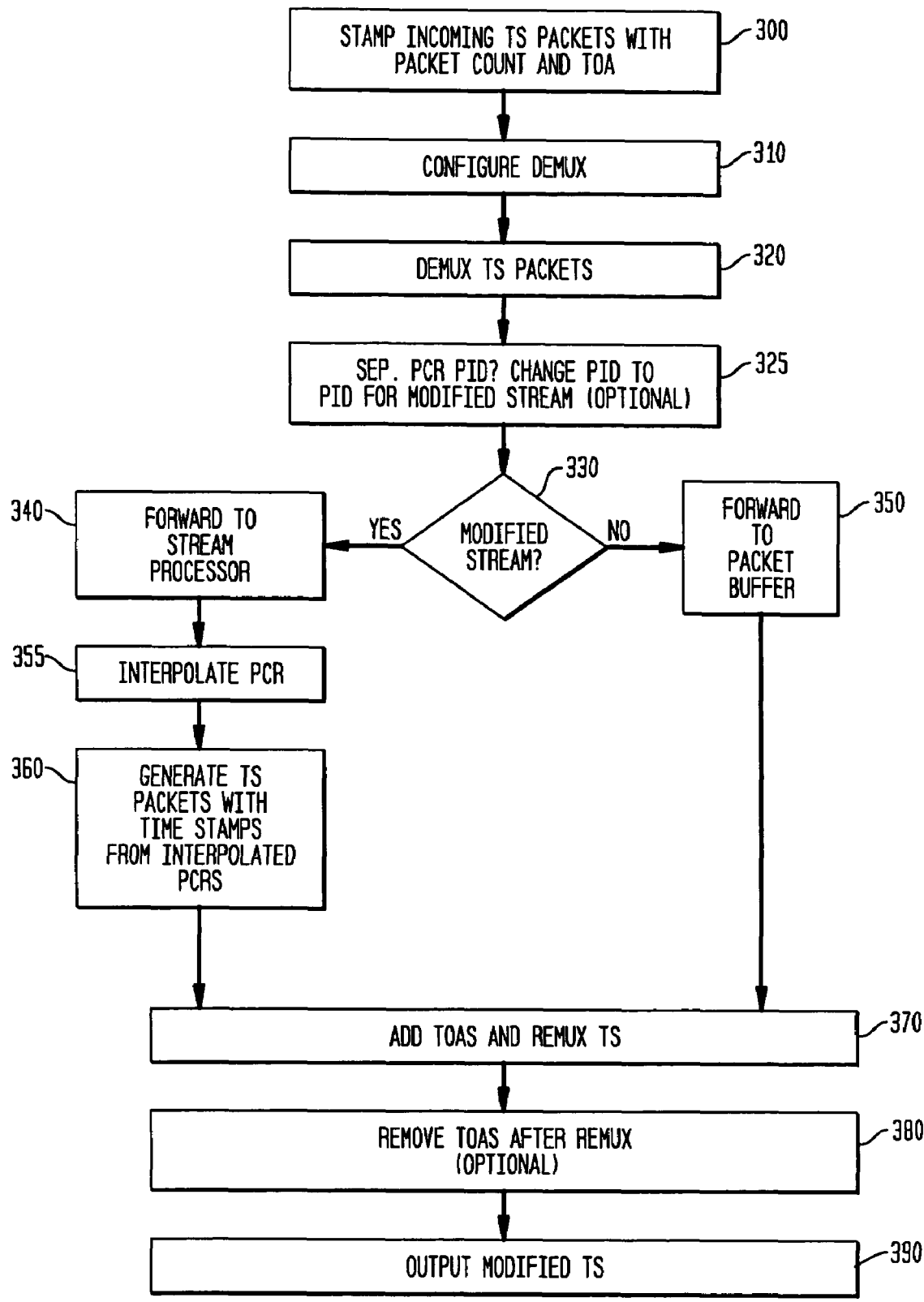
FIG. 4 is a flow chart of the steps for modifying the content of a transport stream with the system of FIG. 3.

FIG. 4 is a flow chart for a first embodiment of the invention and illustrates the basic steps performed by the system 200 from the time a transport stream is received through the time that a modified transport stream is output from system 200. At step 300, the system input subsystem 210 receives each incoming TS packet, and stamps it with its packet count and time of arrival (TOA). The TOA is determined by looking up a local 27 MHz real-time clock (RTC) at system 200, which need not be synchronized to the system time clocks (STC) of any of the programs in the incoming transport stream. The packet count is determined in arrival order, including any MPEG-2 null packets which may be present. The received packets, along with the additional information (packet count and TOA), are sent to the table processor subsystem 220.

The table processor 220, at step 310, determines the different PIDs present in the transport stream, by parsing the tables present in the SI packets. Using this information, table processor 220 configures the demultiplexer subsystem 230 by informing it which PIDs are to be sent to which one or more stream processor 240, and which PIDs are not to be modified. According to this method, PCRs of each modified program are always carried in a PID corresponding to one of the modified elementary streams in that program. Also at step 310, if the table processor 220 determines that incoming PCRs are on a separate PID or in a PID corresponding to an unmodified elementary stream, it modifies the SI tables to indicate that outgoing PCRs for these PIDs are to be included in the PID of a modified elementary stream if a stream processor with this capability is provided. The table processor 220 inserts these SI packets having modified SI tables into the transport stream accordingly.

At step 320, the demultiplexer 230 extracts the PID of each TS packet. At step 325, if the demultiplexer 230 encounters PCRs in a separate PID as indicated by the SI tables, demultiplexer 230 optionally (i.e., if there is an available stream processor 240 with this functionality) changes this PID to that of the modified elementary stream, and passes this packet to the corresponding stream processor 240. If PCRs are encountered in a PID corresponding to an unmodified elementary stream, then each PCR value in a packet in that program is extracted before passing the packet to the non-modified packet buffer 250. The PCR values extracted from the incoming program are inserted into a new TS packet labeled with the PID selected for carrying outgoing PCRs, filled up with stuffing bytes (this TS packet will have no payload), and forwarded to the corresponding stream processor 240 for the modified elementary stream. The associated TOA and packet count of the packet from the original PCR-bearing packet are also carried along with the TS packet that carries the corresponding PCRs for the outgoing program.

At step 330, demultiplexer 230 determines where to route each TS packet. Packets of each PID to be modified are forwarded to a stream processor 240 (step 340), and packets of all the other PIDs, other than PCR-only PIDs, are routed to a packet buffer 250 (step 350). The one (or more) packet buffers are required to hold input TS packets that are not to be modified until the modified TS packets are output by their respective stream processors 240 for multiplexing with the unmodified packets.

At step 355, each stream processor 240 receives its corresponding TS packets, extracts the elementary stream, processes the latter according to its specific processing algorithm, and performs PCR interpolation to calculate new PCR values for various of the TS packets, as described in detail below. At step 360, each stream processor generates TS packets containing the modified elementary stream payload. The newly-generated TS packets are time stamped with the new PCR values. These TS packets are then forwarded to the multiplexer 260.

The multiplexer 260 receives TS packets from the non-modified TS packet buffer, as well as packets from stream processors 240. The multiplexer 260 will calculate a new TOA stamp for TS packets that do not have a TOA. New TOA time stamps are calculated to be as close as possible to the actual TOA which would have been stamped had the modified TS packets been actually received at the system input 210. Using the TOA stamps, the multiplexer 260 determines the time of departure for each outgoing TS packet using a suitable constant delay model, such as a constant delay model described for MPEG-2. According to this approach, the time of departure (TOD) for each outgoing TS packet is determined according to the following equation:

$$TOD=TOA+d, \qquad (1)$$

where d is the constant delay through the system from the instant of arrival to the instant of departure. Multiplexer 260 might incorporate PCR correction in case actual TS packet departure times differ from the ideal value in equation (1). Since each outgoing packet thus effectively undergoes a constant delay through the system, the outgoing transport stream will be a compliant MPEG-2 transport stream.

In considering how to compute new TOAs to be inserted into TS packets output from a stream processor 240 at step 360, it should be recalled that the stream processing in system 200 severs the connection between the input and output bits. Synchronization points in the TS packets, however, are present in both the transport stream input to a stream processor 240 and the bits output from the stream processor 240. Such synchronization points are described in detail in related application Ser. No. 10/641,323 referenced above and described in some detail below.

As taught therein, synchronization points are either physical bit patterns or logical points in the input elementary stream that do not vary under the operation of stream processing, irrespective of any transcoding or splicing. Additional attributes possessed by such synchronization points are that they regularly recur in both the input and output elementary streams, and each such point corresponds to a unique instant in the encoder system time clock (STC).

Synchronization points can be physical or virtual. Physical synchronization points consist of actual bit patterns (finite sequences of bits in the elementary stream) which are present in the input as well as the output, and which are a-priori associated with a certain presentation time. Examples of these are the well-known start codes or syncwords found in all the international video and audio coding standards such as MPEG-1, MPEG-2, MPEG-4, H.261, H.263 and H.26L. For example, in the case of MPEG-1 and MPEG-2 video, these include the sequence header code, GOP start code, picture start code, slice start code, sequence end code and other extension and user data start codes. MPEG-4 video has equivalents of all these start codes except for slice start code.

All MPEG (1, 2 or 4) based video processing devices that do not alter the frame rate must output one picture start code for each one that is received; hence picture start codes are synchronization points for this application. Further, in the case of MPEG-2 video, all such devices must forward the slice start codes received at the beginning of each row of macroblocks; these provide a denser sequence of synchronization points in addition to picture start codes. In the case of MPEG-1 audio Layers 1 and 2, the syncword at the start of each audio frame provides a dense sequence of synchronization points.

Figure 5:
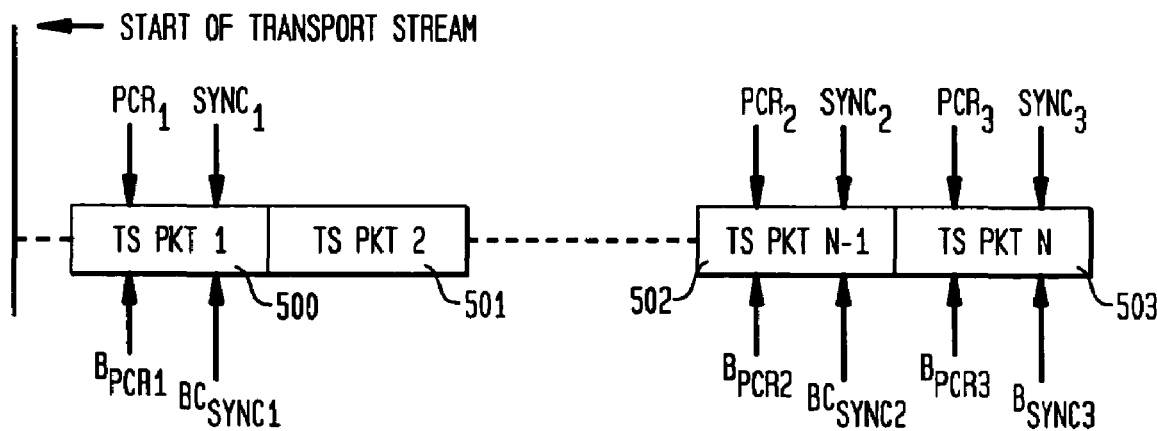
FIG. 5 shows a series of packets in the incoming transport stream and the location of synchronization points in the packets in an embodiment of the present invention.

FIG. 5 illustrates an example in which there are four packets 500-504 within one possible transport stream. Packet 500 has a synchronization point SYNC1 located at byte $B_{SYNC1}$, which is a byte count measured from the start of the transport stream for a particular program. In this example, packet 501 may, but need not have, a synchronization point, packet 502 also has a synchronization point SYNC2 located at byte $B_{SYNC2}$, and packet 503 has a synchronization point SYNC3 located at byte $B_{SYNC3}$.

Figure 6:
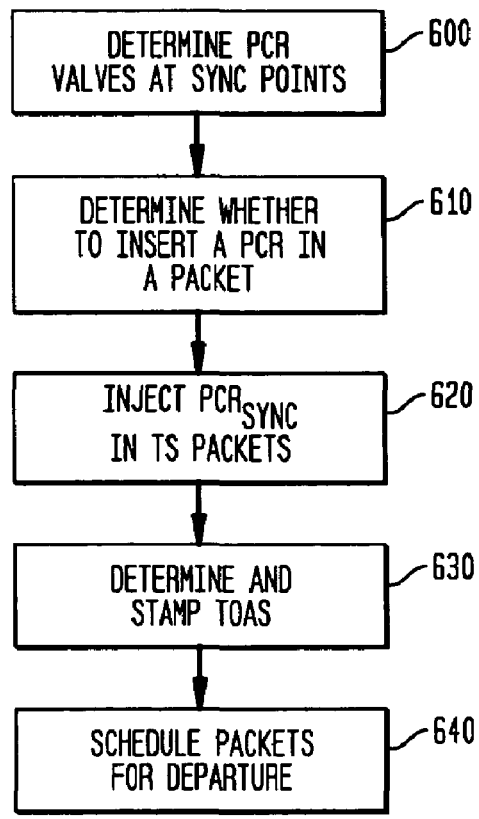
FIG. 6 is a flow chart describing the steps performed for PCR interpolation according to a first method for determining the TOAs to be stamped into the outgoing transport stream.

There are multiple ways in which the synchronization points can be used to determine the TOAs to be inserted in the output TS stream. FIG. 6 illustrates the details of one such algorithm, viz. a PCR interpolation algorithm, in which PCR interpolation is used to determine PCR values for synchronization points in outgoing TS packets. TOA values can then be determined for outgoing packets using the PCR values obtained by interpolation. The PCR interpolation algorithm of this first embodiment requires that the local RTC at system 200 and the program STCs run at the same nominal frequency, e.g., 27 MHz, to convert between PCR and TOA time stamps.

The synchronization points must be selected beforehand during the design of the system such that there is at least one such point between two consecutive PCRs in the input. Therefore, the highest frequency of PCRs expected in the input must be known in advance. Another requirement is that the transport stream packets arrive at a stream processor 240 at a piecewise constant packet arrival rate. Such a model is described in the MPEG-2 System specification.

FIG. 6 illustrates the PCR interpolation algorithm. At step 600, the PCR time values of each pre-selected synchronization point in the input program are calculated before the content in the elementary streams is modified. The PCR values for each point is calculated as follows at each input synchronization point ($PCR_{SYNC}$) according to the following equation:

$$PCR_{SYNC}=PCR_1+(PCR_2-PCR_1)*BC_{SYNC}/(B_{PCR2}-B_{PCR1}). \quad (2)$$

In equation (2), $PCR_1$ and $PCR_2$ are two successive PCR values that arrived in two transport stream packets between which the synchronization point occurred in the input transport stream. As illustrated in FIG. 5, $B_{PCR1}$ and $B_{PCR2}$ are the byte offsets of the first bytes of the two PCR values, respectively, in the full input transport stream (including all programs in the transport stream), counting from the first byte of the transport stream, and $BC_{SYNC}$ is the byte offset (i.e., byte count) of the first byte of the synchronization point from the last byte of the PCR value corresponding to $PCR_1$, again counting all the intervening bytes in the full input transport stream. These byte offsets are in turn calculated using the incoming packet counts stamped by the system input subsystem 210. The content is then modified at processor 240 and a modified sequence of transport stream packets are output.

The next step, step 610, is to determine at the output of a stream processor 240 whether or not to insert one of the newly-calculated PCR values for the synchronization points, i.e. the $PCR_{SYNC}$ values, into the modified transport stream packet being generated. PCRs are inserted at step 620 only in outgoing TS packets containing synchronization points. Even though PCR values can be determined (using the previous step) for each input synchronization point, all of them need not necessarily be inserted into the output.

Any method may be used for selecting which subsequence of synchronization points to use for PCR injection at the output. One suitable method is to interpolate PCR values for exactly one synchronization point between every two successive incoming PCRs, and inject this PCR into the outgoing TS packet containing this synchronization point. This implies that one PCR will be output for every PCR received in the input. This ensures that if the PCR frequency of the input program is compliant as required by the MPEG-2 System or DVB specifications, then so will the PCR frequency of the output. For this method, the synchronization points have to be selected so that there is at least one synchronization point between every two successive PCRs in the input.

Another suitable method for selecting which subsequence of synchronization points to use for PCR injection at the output is to use a denser sequence of synchronization points for PCR interpolation, and to select synchronization points for output PCR injection only when a PCR needs to be injected to maintain PCR frequency compliance. Other methods may alternatively be determined to be suitable for carrying out this step. Irrespective of the method used for selecting synchronization points for output PCR injection, the invention teaches that the PCR value of each selected synchronization point ($PCR_{SYNC}$) is injected into the outgoing transport stream packet in which it is carried. Further, the synchronization point is made the start of the transport packet payload, by terminating the previous transport stream packet with the same PID using stuffing bytes.

In an alternative implementation, the stuffing bytes can be reduced by interpolation of PCR values to correspond to the start of the transport packet.

Next, at step 630, TOA values are determined for each outgoing TS packet generated by the stream processor 240. This step is achieved at the multiplexer 260, instead of the stream processor 240. Two different situations must be handled. The first case is for PCR-bearing packets (which contain the outgoing synchronization points). The other case is for the remaining transport stream packets that do not have PCRs.

To determine TOA values for outgoing PCR-bearing packets, the 27 MHz nominal frequency of the RTC and STC is exploited to convert between PCR (sample of STC) and TOA (sample of RTC). One method for determining the substitute TOAs is to use phase-locked loops for each incoming program to synchronize a corresponding RTC to the STC, as described in the MPEG-2 System specification.

Another approach is to hypothesize a relation between RTC and STC of the form $$RTC=F(STC;\theta), \quad (3)$$

where $F(STC;\theta)$ is a known function of the unknown parameter vector $\theta$, estimate $\theta$ as $\hat{\theta}$ using past history of (RTC, STC) pairs, and use this estimated parameter vector to determine the TOA for a given PCR as $$TOA=F(PCR;\hat{\theta}), \quad (4)$$

An example of such a functional relation described in equation (3) is the linear relation:

$$RTC=M*STC+C, \quad (5)$$

where M and C constitute the unknown parameters. For a particular $RTC_{dep}$, which is the estimated real-time departure instant of the current PCR-bearing packet n, M and C can be estimated using linear interpolation between successive pairs of clock samples. Given samples at packets n−1 and n, the parameters are estimated as:

$$M=(RTC_n-RTC_{n-1})/(STC_n-STC_{n-1}) \quad (5A)$$

$$C=RTC_{n-1}-M*STC_{n-1} \quad (5B)$$

These values of M and C can be used to compute the desired TOA at a particular RTC for a given PCR determined at a particular STC.

While the linear interpolation method is conceptually simple, it is sensitive to noise or errors in the measurement of the sample pairs ($STC_n$, $RTC_n$). Furthermore, the STC center frequency is not constant and may drift, the slope estimate of M can vary by large amounts.

Therefore, the value of RTC can alternatively be estimated using a more robust estimation method, such as a gradient descent algorithm like a Least Mean Squares (LMS) algorithm (See, e.g., *Adaptive Filter Theory*, Chap. 5, $3^{rd}$ ed., Simon Haykin, Prentice Hall, Inc., 1996), a least squares algorithm, or some other well known linear parameter estimation algorithms (See, e.g. *System Identification: Theory for the User*, Lennary Ljung, Prentice Hall, 2d ed., 1999). The best algorithm to use will depend on the circumstances. While least squares has the fastest speed of convergence and is least affected by noise, it requires powerful computational requirements.

Using any of these methods, the TOA for an outgoing TS packet carrying a PCR (and the associated synchronization point) is determined and stamped.

For stamping the TOA of generated TS packets that do not contain PCRs, the piecewise constant byte arrival order prescribed in the MPEG-2 System specification of a transport stream is utilized. The multiplexer 260 buffers all generated transport stream packets for each modified program in a buffer (not shown) large enough to hold all the packets between and including two successive PCR-bearing packets. It then calculates the inter-PCR-interval between every pair of PCR bearing packets for each program, by subtracting the TOA of the earlier packet from that of the latter packet. The multiplexer 260 analyzes the non-modified TS packet buffer for each modified program to determine the number of TS packets for that program that have TOAs between the TOA of the boundary PCR-bearing packets and adds it to the number of modified TS packets between these same two boundary packets. It assigns TOA values to all of these intervening packets by distributing them uniformly between the TOAs of the boundary packets, following the piecewise constant byte rate model. In this manner, all packets of a program that is modified by the stream processor 240 get stamped with correct TOA values.

Finally, at step 640 the multiplexer 260 schedules each packet to depart after a constant delay past its TOA, as explained earlier, thus delivering a compliant MPEG-2 transport stream. In each embodiment described herein, the TOAs may be removed from each TS packet before the packet is output from the multiplexer 260.

II. TOA Interpolation

As an alternative to PCR interpolation, a second method for maintaining timing of TS packets after stream processing at a re-multiplexer to output a Standard-compliant transport stream is described in related application Ser. No. 10/640,866 referenced above. This second method for determining TOA values for each outgoing TS packet uses direct TOA interpolation at synchronization points and is described herein with reference to FIGS. 7A, 7B, 8 and 9 and an MPEG-2 compliant transport stream.

Figure 7A:
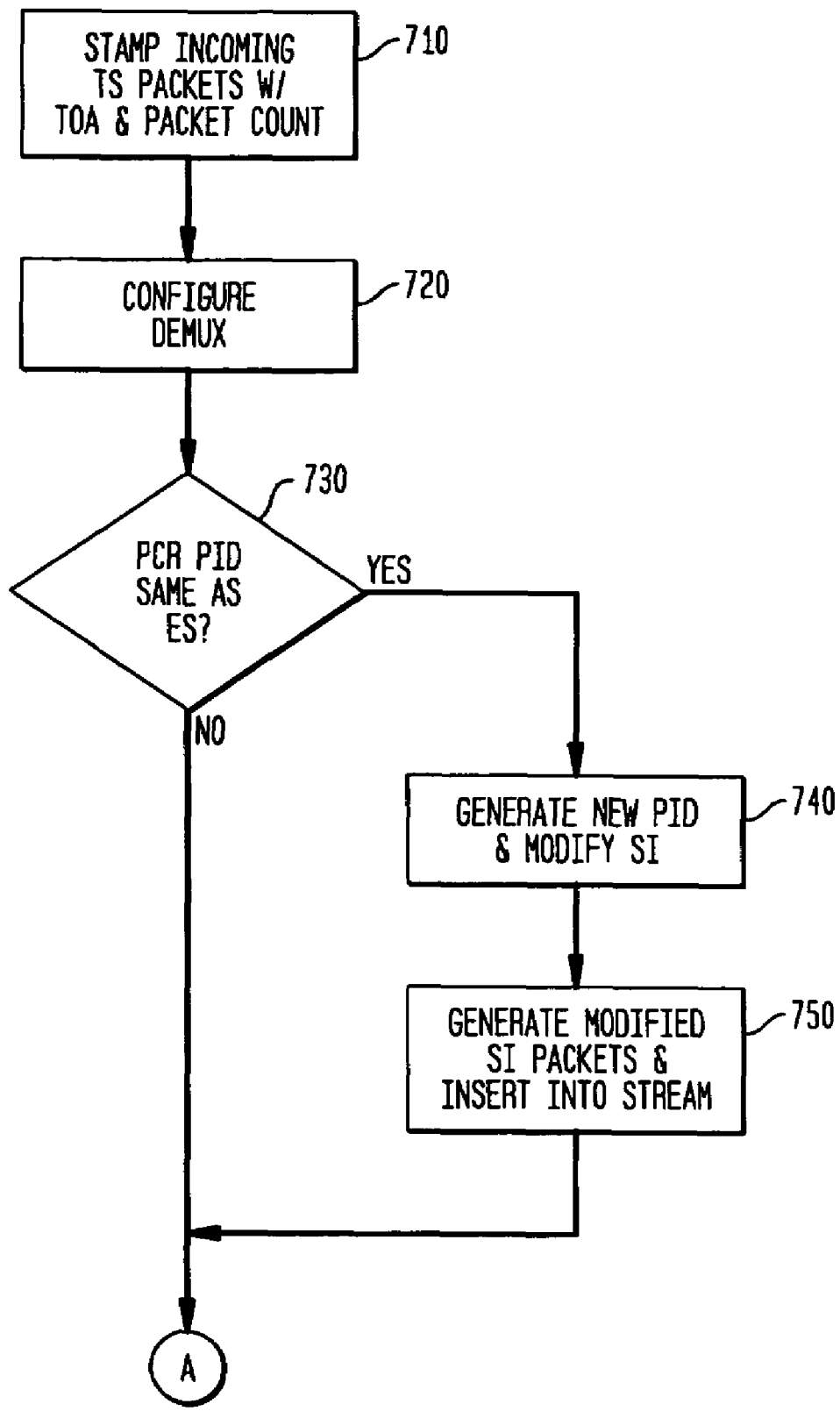
FIG. 7A is a flow chart of the initial steps undertaken in another embodiment of the invention for maintaining synchronization between information input to and output from a re-multiplexer by removing TOA stamps from information being processed and substituting TOA stamps corresponding to synchronization points.
Figure 7B:
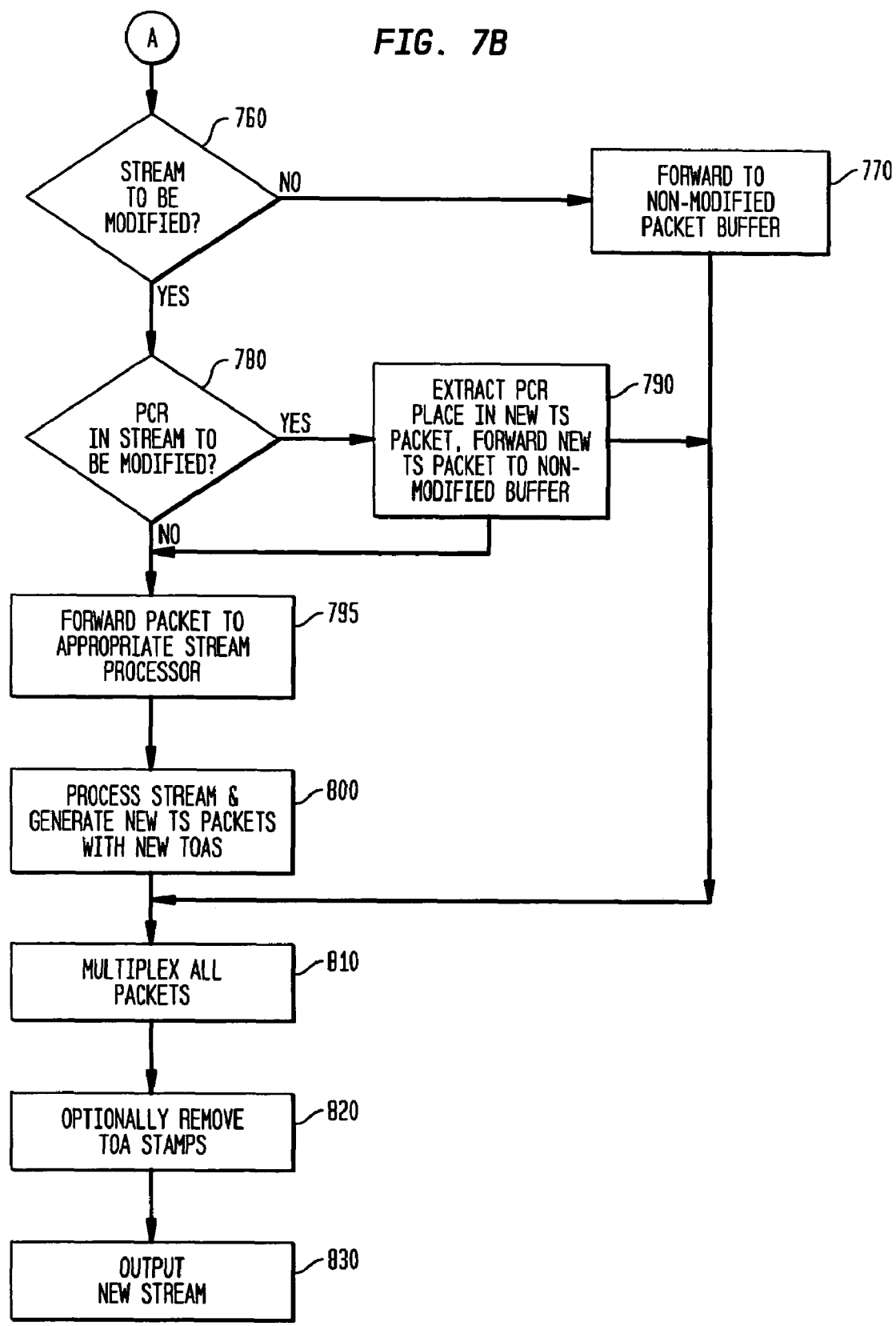
FIG. 7B is a flow chart of subsequent steps undertaken for carrying out the embodiment of FIG. 7A.

FIGS. 7A and 7B are flowcharts of the steps performed by system 200 from the time that a transport stream is received through the time that a modified transport stream is output from system 200. At step 710 the System Input subsystem 210 receives each incoming TS packet, and stamps it with its packet sequence count and arrival time (TOA). The TOA is determined by looking up real-time clock (RTC), which need not be synchronized to the System Time Clocks (STC) of any of the programs in the incoming transport stream (in fact, the local clock need not even have the same nominal 27 MHz frequency). The packet count is determined in order of arrival, and the count includes any MPEG-2 null packets which may be present. The received packets, along with the additional information (TOA and packet count), are sent to the table processor 220.

At step 720, the table processor 220 determines the different PIDs present in the transport stream, by parsing the tables present in the SI packets, and configures the Demultiplexer subsystem 230 by informing it as to which PIDs are to be sent to which one or more stream processors 240, and which PIDs are not to be modified. According to this second method, PCRs are never output in a packet with a PID corresponding to a modified elementary stream. If, in step 730, the table processor 220 determines that an incoming PCR PID is the same as that of an elementary stream that is to be modified, table processor 220 generates a new PCR PID that is different from all other PIDs present in the input transport stream, and modifies the SI tables, as shown in Step 740. At step 750, table processor 220 generates and inserts modified SI packets into the transport stream accordingly.

At step 760, the Demultiplexer subsystem 230 extracts the PID of each TS packet and determines whether the TS packet is part of a stream that is to be modified. Any packet that is not part of a stream to be modified is sent to a Non-Modified Packet Buffer 250, as shown in step 770. The Non-Modified Packet Buffer 250 is used to hold input TS packets that are not to be modified until the modified TS packets output by Stream Processors 240 are ready for multiplexing with the unmodified packets.

If the Demultiplexer subsystem 230 in step 780 encounters a PCR in a packet with a PID that is the same as that of an elementary stream that is to be modified, it extracts and copies the PCR into a new TS packet identified with the new PCR PID generated by the table processor 220, fills up the rest of this new PCR-bearing packet with stuffing bytes, and passes this packet to the Non-Modified Packet Buffer 250 as shown in step 790. The PCR is removed from the original TS packet before the latter is forwarded in step 795 to the corresponding Stream Processor 240. All other TS packets that are to be modified and that do not contain PCRs bypass Step 790 and are forwarded directly to the corresponding Stream Processor 240.

At step 800, each Stream Processor 240 receives its corresponding TS packets, extracts the elementary stream, processes the stream according to its specific processing algorithm, and generates new TS packets containing the modified elementary stream payload. Further, according to this invention, it stamps each generated TS packet with a TOA that is as close as possible to the actual TOA which would have been stamped had the modified TS packets been actually received at the input, by interpolating the input TOA values using an interpolation algorithm. These new modified TS packets with the generated TOA values are passed along to the Multiplexer 260.

At step 810 the Multiplexer 260 receives TS packets from the Non-Modified Packet Buffer 250, as well as the collection of Stream Processors 240 in the system. In all cases, TS packets received by the Multiplexer 260 contain corresponding TOA stamps. Using the TOA stamps, the Multiplexer 260 determines the time of departure for each outgoing TS packet using a constant delay model, such as a constant delay model described for MPEG-2. According to this approach, the time of departure (TOD) for each outgoing TS packet is determined as specified above by equation (1), viz. TOD=TOA+d. The Multiplexer 260 might incorporate PCR correction in case actual TS packet departure times differ from the ideal value as calculated in Equation (1). Since each outgoing packet thus effectively undergoes a constant delay through the system, the outgoing transport stream will be a compliant MPEG-2 transport stream.

At step 820, multiplexer 260 may optionally remove TOA stamps after multiplexing. At step 830, the new transport stream is output.

Description of Output TOA Computation

As described above, a fundamental problem faced by the Stream Processor 240 in computing output TOAs is to determine how to associate TOA values for outgoing TS packets when the operation of stream processing destroys any connection between input and output bits. Synchronization points may be used for this purpose.

The synchronization points must be selected beforehand during the design of the system. According to one method of selection in this embodiment, the synchronization points are selected such that there is at least one such point in every incoming TS packet carrying the elementary stream to be processed; this would ensure that there is a synchronization point for every incoming TOA stamp. A less demanding method is to select a less frequent sequence of synchronization points and use interpolation to calculate TOA values for outgoing TS packets.

Figure 8:
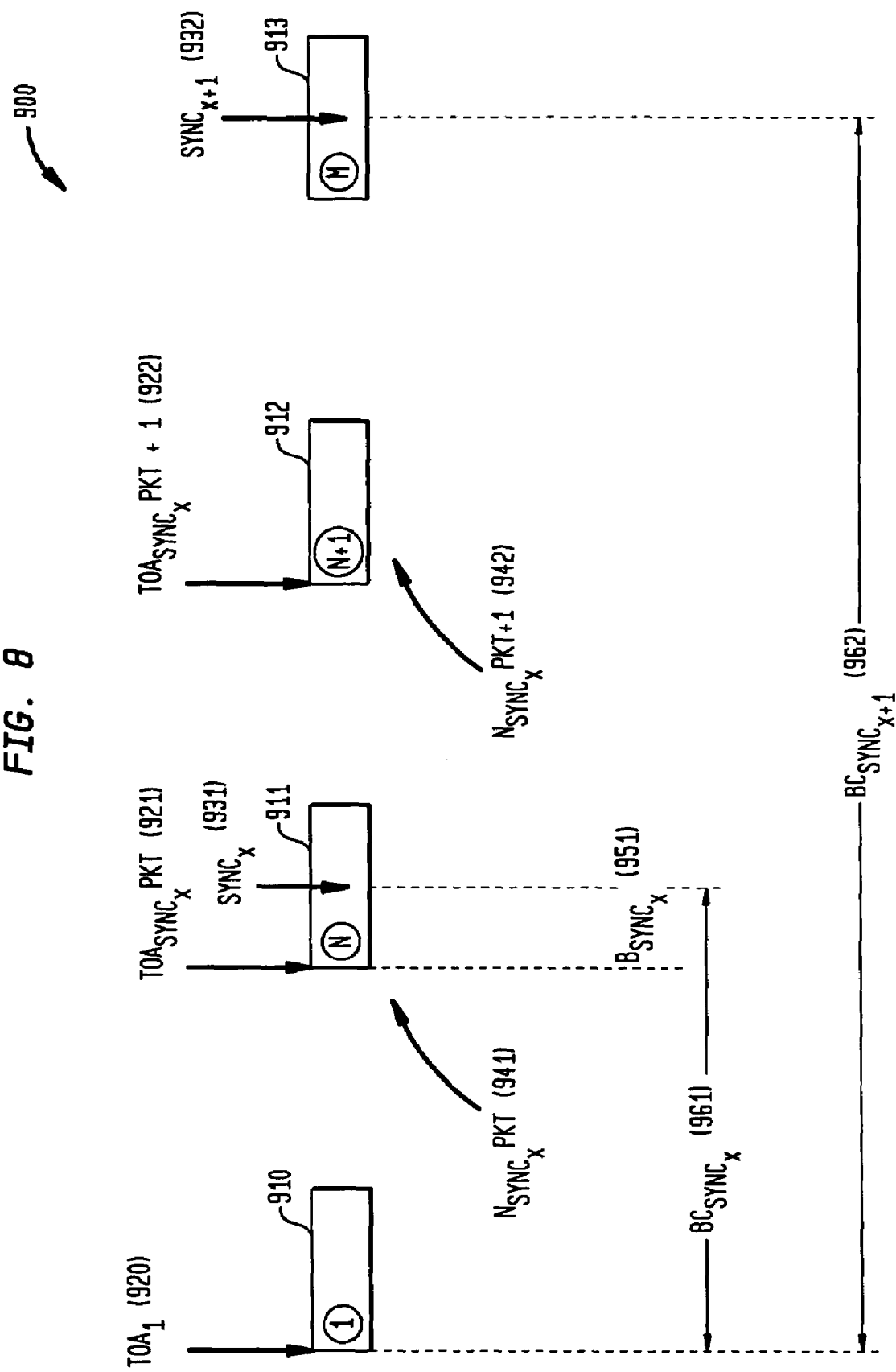
FIG. 8 shows a series of packets from the same elementary stream with their packet count and arrival time, in the incoming transport stream and the location of synchronization points in the packets in accordance with the embodiment of FIGS. 7A and 7B.
Figure 9:
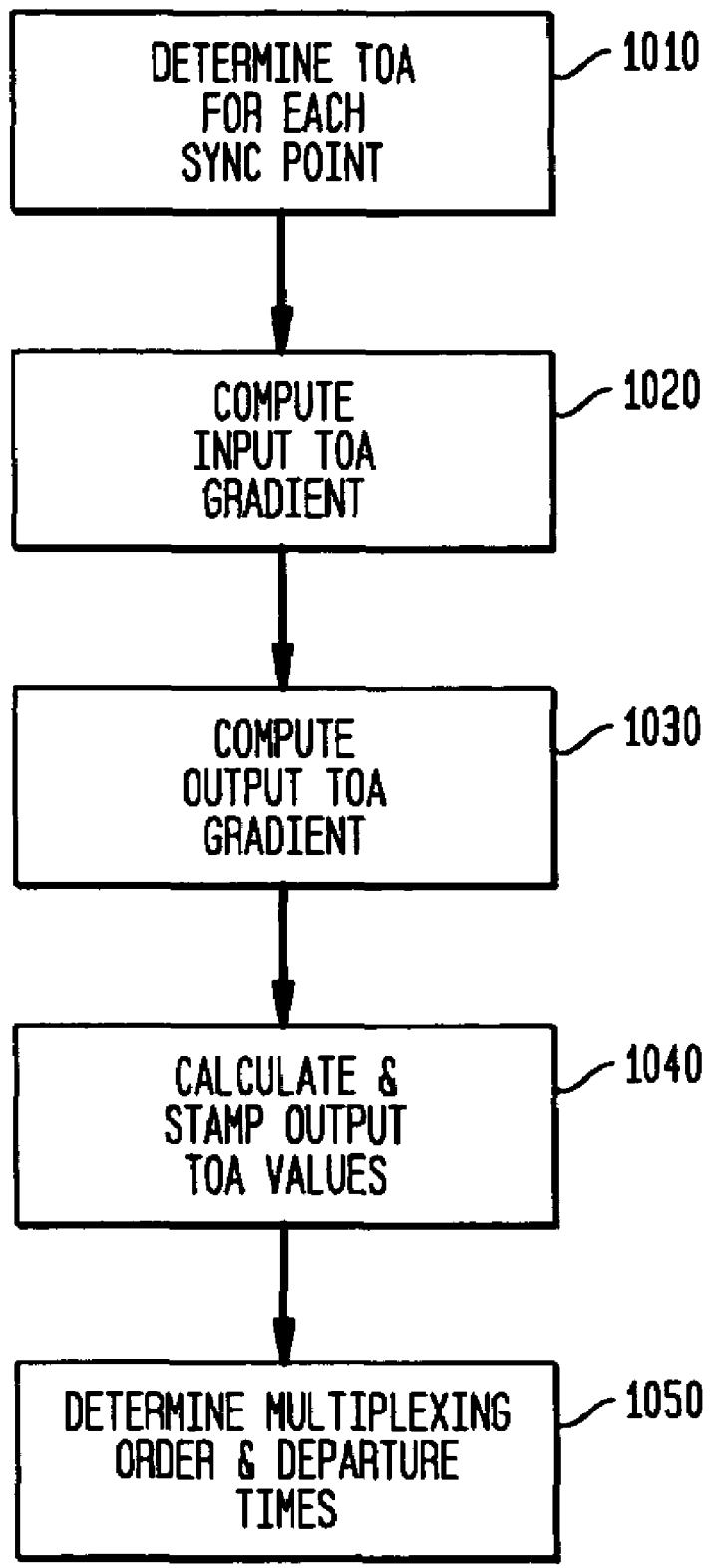
FIG. 9 is a flow chart describing the steps performed for calculating TOAs to be stamped onto modified packets in the outgoing transport stream in accordance with the embodiment of FIGS. 7A, 7B, and 8.

FIGS. 8 and 9 illustrate how the second method uses the information System Input subsystem 210 stamps on each TS packet and synchronization points to calculate "arrival times"

for modified packets. The first step 1010 in the method is to determine the TOA for the start of each synchronization point in the input. This is the instant at which the first byte of the synchronization point entered the system. This step is carried out at the input to the Stream Processor 240. The TOA (TOA$_{SYNCx}$) of a given synchronization point, SYNC$_x$ 931, is calculated as:

$$TOA_{SYNCx} = TOA_{SYNCxPKT} + (TOA_{SYNCxPKT+1} - TOA_{SYNCxPKT}) * B_{SYNCx}/(188*(N_{SYNCxPKT+1} - N_{SYNCxPKT})) \quad (6)$$

where TOA$_{SYNCxPKT}$ 921 and TOA$_{SYNCxPKT+1}$ 922 are the input TOA stamps (as stamped by the System Input subsystem 210) of the incoming TS packet 911 containing Synchronization Point, SYNCx 931, and the TOA stamp of the next TS packet 912 with the same PID, N$_{SYNCxPKT}$ 941 and N$_{SYNCxPKT+1}$ 942 are the packet sequence counts (again as stamped by the System Input subsystem 210) of the above two TS packets with TOA=TOA$_{SYNCxPKT}$ 921 and TOA=TOA$_{SYNCxPKT+1}$ 922, respectively, and B$_{SYNCx}$ 951 is the distance in bytes between the first byte of the Synchronization Point, SYNCx 931 and the start of the TS packet containing it.

The effect of the above calculation is to translate the TOA from the start of the TS packet to the actual byte in the payload corresponding to the start of the synchronization point. Thus, step 1010 is carried out at the input to the Stream Processor 240, before the stream undergoes alteration.

The crucial advantage achieved in this step is that by definition each synchronization point also appears in the output and thus the TOA is available for these points in the output. The inventive method further teaches how to interpolate, from this sparse sequence of output TOA values, the appropriate TOA values for the start of each outgoing TS packet. This is achieved by first computing the gradient of the TOA (change in TOA per byte) between two successive synchronization points at the output, and using this gradient to stamp TOA values for each outgoing TS packet between these synchronization points.

The system next computes the output TOA gradient between every pair of successive synchronization points at the output. This is carried out at the time of output TS packet generation, and consists of two parts. In the first part, step 1020, the input TOA gradients are calculated as follows:

$$\Delta IN_{SYNCx} = (TOA_{SYNCx+1} - TOA_{SYNCx})/(BC_{SYNCx+1} - BC_{SYNCx}), \quad (7)$$

where TOA$_{SYNCx}$ and TOA$_{SYNCx+1}$ are the TOA values of two successive synchronization points, as computed using Equation (6), and BC$_{SYNCx}$ 961 and BC$_{SYNCx+1}$ 962 are their corresponding byte offsets in the input transport stream counting from the first byte in the input. The byte offset of any synchronization point in the input may be calculated as $$BC_{SYNC} = 188 * N_{SYNCPKT} + B_{SYNC}, \quad (8)$$

where N$_{SYNCPKT}$ is the packet sequence count of the input TS packet in which the synchronization point is contained, and B$_{SYNC}$ is its byte offset from the start of that packet, as described in the explanation for Equation (6).

The $\Delta IN_{SYNC}$ values correspond to the gradient of TOA at every output synchronization point, counted using input byte counts. But due to the modification of the underlying elementary stream by the stream processing algorithm, the number of input bytes between two synchronization points in the input may not match with the number of bytes between the same two synchronization points at the output. To account for this, the required output TOA gradient is computed in step 1030 from the input gradient by multiplying the latter by the transmission ratio, which is the ratio of input bits to output bits resulting from the particular stream processing operation that is used. For example, in the case of translating or reduction of bit rate, the transmission ratio would be equal to or greater than unity. However, in the case of splicing, where a portion of the input stream is replaced by a second stream, this ratio can be less than unity. Further, most stream processing operations modify the input bit counts in a variable manner, resulting in a variable transmission ratio; hence the latter must be recomputed for each synchronization point. The output TOA gradient, $\Delta OUT_{SYNCx}$, at a given synchronization point, SYNC$_x$ 931, is thus calculated as:

$$\Delta OUT_{SYNCx} = \eta_{SYNCx} * \Delta IN_{SYNCx}, \quad (9)$$

where $\eta_{SYNCx}$ is the transmission ratio of the synchronization point SNYC$_x$, and refers to the ratio of bytes between the synchronization point, SNYC$_x$, and the subsequent synchronization point in the input, and the corresponding byte count between the same two points in the output. The invention teaches that ideally, the value of $\eta_{SYNC}$ should be recomputed for every synchronization point. However, the invention also teaches a less restrictive approach in which it is recomputed only once for every suitably defined group of synchronization points. For example, in case of video transcoding, all the synchronization points in a picture can have the same value of $\theta_{SYNC}$, calculated using the input and output byte counts of a picture.

The final step, step 1040, is to determine and stamp the output TOA values for each outgoing TS packet. This is achieved as follows. For each outgoing TS packet containing a synchronization point, the TOA (TOA$_{SYNCPKT}$) is calculated using the TOA of the synchronization point, the output byte offset and output TOA gradient:

$$TOA_{SYNCPKT} = TOA_{SYNC} - BOUT_{SYNC} * \Delta OUT_{SYNC}, \quad (10)$$

where BOUT$_{SYNC}$ is the output byte offset of the synchronization point from the start of the packet. For all other packets, the TOA (TOA$_{PKT}$) is extrapolated from the TOA of the preceding TS packet containing a synchronization point (TOA$_{SYNCPKT}$), using the output TOA gradient:

$$TOA_{PKT} = TOA_{SYNCPKT} + 188 * N_{PKT} * \Delta OUT_{SYNC}, \quad (11)$$

where N$_{PKT}$ is the distance (in output packet counts) of this TS packet from the last output TS packet containing a synchronization point.

As described earlier, the output Multiplexer 260, in step 1050, uses the TOA of outgoing TS packets to determine their multiplexing order and departure times using a constant delay approach, thus delivering a compliant MPEG-2 transport stream.

III. PCR Interpolation+TOA Interpolation

A third method combines aspects of the first and second methods for re-stamping PCR and TOA values for outgoing TS packets after stream processing, by combining the two methods. This third method makes use of the fact that both PCR values and TOA values can be interpolated at any synchronization point.

In the combined method, synchronization points are selected during system design using the same approach as taught in the second method for TOA interpolation alone. As explained, synchronization points are selected for TOA interpolation by either selecting a type of synchronization point that is present in each transport stream packet or selecting synchronization points that occur on a somewhat less frequent basis. The minimum frequency of synchronization points is ultimately a user choice that involves a tradeoff between the frequency of the error arising from interpolation that will be permitted and the permissible complexity of the calculations. The higher the frequency of the synchronization points, the lower the error, and vice versa.

For this combined PCR and TOA interpolation method, PCR PIDs are handled as explained in the first method described above, i.e., all PCRs for each program are carried in transport stream packets assigned to a PID corresponding to one of the modified elementary streams of the program. Further, since PCRs are to be injected into the modified elementary stream, a PCR injection strategy is chosen at design, as explained above. Typically, because synchronization points must be selected to minimize TOA interpolation error, synchronization points should be selected to occur at a higher frequency than required for PCR frequency compliance. Hence a recommended method of PCR injection is to track, for each PCR occurring at the input to a stream processor 240, the synchronization point which is closest to it, and inject a PCR into the output TS packet carrying this marked synchronization point. Since synchronization points are selected to occur at a relatively high frequency compared to the required minimum frequency for synchronization points for PCR interpolation only, there will invariably be a unique synchronization point for each input PCR.

Figure 10:
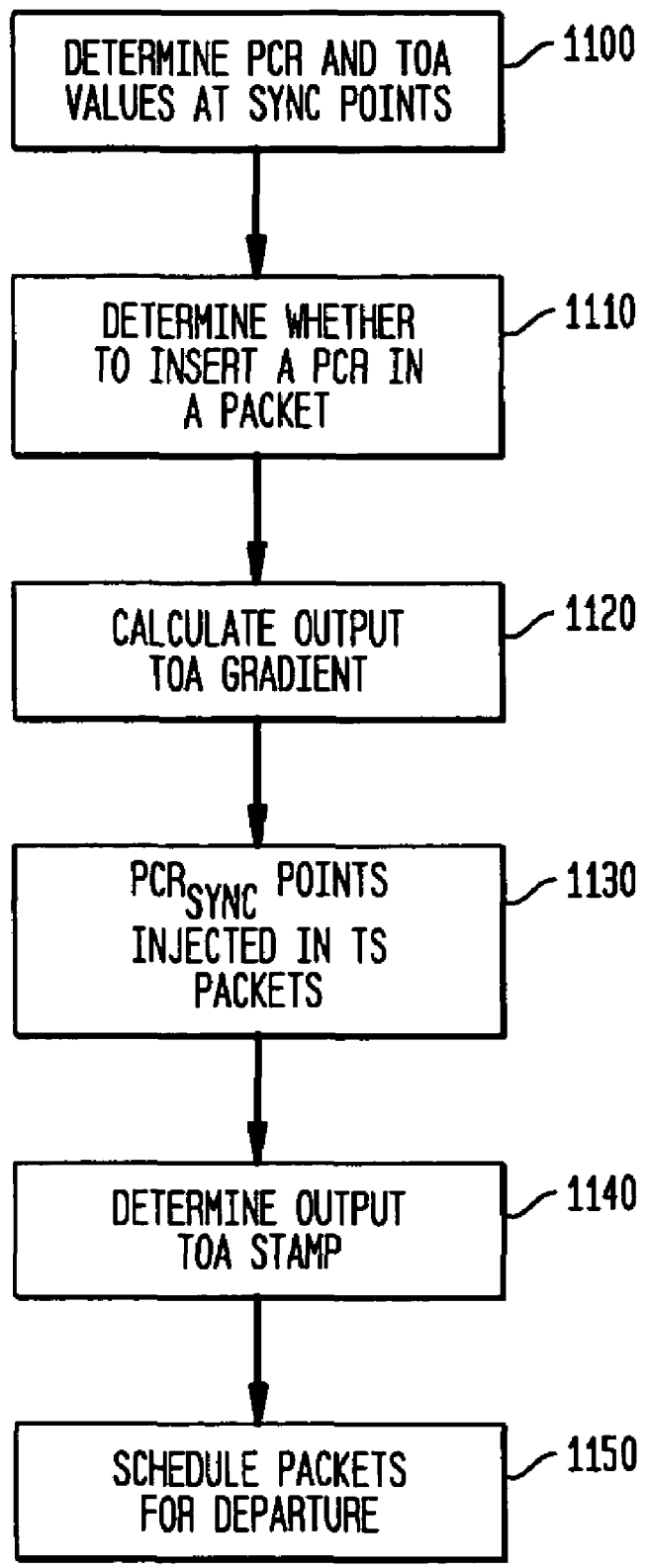
FIG. 10 is a flow chart describing the steps performed in a third embodiment of the invention which uses both PCR and TOA interpolation for determining PCR and TOA stamps, respectively, for the outgoing transport stream.

As shown in the flow chart of FIG. 10, in the first step of the combined method (step 1100), PCR and TOA values are determined by separately interpolating these values at each synchronization point, operating at the input to the stream processors 240. PCR values are interpolated using equation (2) and TOA values are interpolated using TOA interpolation using equation (6). In the second step (step 1110), it is determined, as at step 620, whether or not to insert a PCR in a packet. Next, at step 1120, which is carried out at the time of output TS packet generation, the output TOA gradient is calculated at each synchronization point to be packetized using equations (7)-(9). In the fourth step (step 1130), when a synchronization point marked as associated with an input PCR is encountered for packetization at stream processor 240, the PCR value interpolated for this synchronization point is injected into that TS packet, as described above for the PCR-interpolation-only method. At step 1140, the calculated output TOA gradient is used to determine the output TOA stamp for each generated TS packet to be remultiplexed at the multiplexer 260 using equations (10) and (11). At step 1150, the multiplexer 260 schedules each packet to depart after a constant delay past its TOA, thus delivering a compliant MPEG-2 transport stream.

The third method offers the following advantages over the first two methods:

1. If PCR interpolation is used alone, the system needs to convert between the local RTC and the STC of each program, in order to determine the TOA of PCR-bearing packets from the interpolated PCR values at the contained synchronization points. This conversion, which is computationally expensive and sensitive to estimation error, is not required in the combined method since the TOA value at each synchronization point is computed directly from the input TOA stamps.
2. If PCR interpolation is used alone, the TOA of outgoing TS packets between PCR-bearing packets need to estimated by spacing them uniformly between the TOAs of consecutive PCR-bearing packets. This is because the TOA of such packets is interpolated directly from the TOA of synchronization points. By selecting a sufficiently high frequency of synchronization points in the combined method, the interpolation error in this step is made extremely small.
3. If TOA interpolation is used alone, packets containing PCRs need to go in a separate PID in the transport stream, with no payload for the rest of the packet. This is wasteful of available bit rate, resulting in lower perceptual quality of the modified audio-visual program for a given bit rate, compared to injecting PCRs in a PID of an elementary stream. The latter is the case in the combined method, which thus results in better perceptual quality than with TOA interpolation alone.

Selecting Synchronization Points

As explained above, the input transport stream is parsed to identify "synchronization points" in the elementary stream it carries. Synchronization points are points or locations within a stream that can be used as a basis for identifying locations near which incoming ancillary data, such as PCR and TOA stamps, should be located in a new transport stream carrying a processed version of the incoming elementary stream. In principle, synchronization points are locations in the elementary stream which are known to bear a clear and fixed timing relationship with the system time clock of the program comprising the elementary stream and therefore can serve as a basis for retiming or re-synchronizing ancillary data to the system time clock in a sufficiently accurate fashion.

The types of synchronization points used according to the invention illustratively meet all of the following criteria:

(a) System Time Clock Correspondence: An important underpinning of the invention is that ancillary data can be retimed or re-synchronized in the new systems layer stream produced after stream processing by locating the ancillary data in a certain vicinity of a synchronization point of the elementary stream after stream processing ("processed elementary stream"). That is, in lieu of determining the location by direct reference to the system time clock (which would require recovery of the system time clock), the ancillary data is located in a vicinity of a synchronization point of the elementary stream (which in turn, is in synchronism with the system time clock of the program comprising the elementary stream). Therefore, the type of point chosen for use as a synchronization point must correspond with a particular determinable time of the system time clock of the program comprising the elementary stream, even though this particular time need not be explicitly determined.

(b) Invariance to Stream Processing: According to the invention, ancillary data is initially located within the original systems layer stream, which in the embodiments discussed above is the transport stream, in a certain vicinity of a specific identifiable synchronization point in the elementary stream, prior to stream processing. Likewise, after stream processing, this ancillary data should be located within the new transport stream (more generally, the new systems layer stream) in a similar vicinity to the same synchronization point of the stream-processed elementary stream. In order to enable re-locating the ancillary data in the new elementary stream, the same synchronization point must be present in the elementary stream both before stream processing and after stream processing.

(c) Continual Recurrence In The Elementary Stream: Generally, ancillary data is expected to recur continually throughout the systems layer stream, or at least the sequence carrying the processed elementary stream. Likewise, the type of synchronization point chosen for use in the invention should also continually recur within the processed elementary stream. In other words, over the course of time, so long as information is being carried in the systems layer stream for the elementary stream to be stream processed, and so long as there is ancillary data to be retimed or re-synchronized, one should also expect to find synchronization points in the elementary stream. Otherwise, such candidate synchronizations point cannot provide a suitable reference by which to relate the ancillary data.

In addition to the above criteria, it is preferable to choose a type of synchronization point that occurs frequently within the elementary stream. As will be appreciated from the description below, the higher the frequency of occurrence of the synchronization point, the more accurate will be the retiming or re-synchronizing of the ancillary data in the new transport stream carrying the processed elementary stream. More specifically, two successive synchronization points define a temporal locale, which is a portion of an elementary stream corresponding to an elapsed duration in time of the system time clock of the program of which the elementary stream is a component. According to the invention, ancillary data occurring in a given temporal locale (between two synchronization points) of an input systems layer stream is gathered prior to processing the systems layer stream, and the specific temporal locale in which the ancillary data was gathered, is noted. After stream processing, the corresponding temporal locale in the processed elementary stream is located, and the ancillary data is inserted into the new systems layer stream, containing the processed elementary stream, at that identified temporal locale. However, the amount of elementary stream data in a given temporal locale may change as a result of the stream processing. As such, the precise corresponding time of the systems time clock at which ancillary data may be inserted into the new systems layer stream will be different than the original time of the systems time clock of the location within the original systems layer stream from which the ancillary data was extracted. This difference introduces an error or drift in the synchronism of the ancillary data relative to the original timing of such ancillary data in the systems layer stream before processing. It is desired to maintain such a synchronism error or drift within a tolerable range. In a worst case scenario, ancillary data located in the original systems layer stream at one end of a temporal locale (e.g., at the latest time or end of the temporal locale) is inserted into the new processed systems layer stream at the opposite end of the temporal locale (e.g., the earliest time, or beginning of the temporal locale). As can be appreciated, the maximum error or drift in synchronism is approximately equal to the duration of the temporal locale. Therefore, by increasing the frequency of synchronization points, the duration of temporal locales is shortened and the maximum possible error or drift in synchronism of ancillary data is reduced. In any event, it is generally preferred for the frequency of occurrence of the type of synchronization point to be at least equal to the frequency of occurrence of the ancillary data to be retimed or re-synchronized.

Considering these criteria, there are two classes of synchronization points that can be used, as discussed above. One is a physical synchronization point, which corresponds to a predefined, unvarying sequence of bits or code which can be identified in the bitstream. For example, in the case of an MPEG-1, MPEG-2 or MPEG-4 elementary stream, any start code can serve as a synchronization point. In the MPEG-1, MPEG-2 and MPEG-4 standards, each start code is a 32 bit code comprising a 23 bit start code prefix 0000 0000 0000 0000 0000 0001 followed by one byte that distinguishes the type of start code from each other type. The following are examples of MPEG-2 video start codes, and the distinguishing byte that identifies them:

TABLE 1

| Name | Start code identifier |
| --- | --- |
| Picture_start_code | 00 |
| slice_start_code | 01 - AF |
| user_data_start_code | B2 |
| sequence_header_code | B3 |
| extension_start_code | B5 |
| sequence_end_code | B7 |
| group_start_code | B8 |

Of these, the group_start_code, the picture_start_code and the slice_start_code are typically good candidates for use as synchronization points. The group_start_code immediately precedes a group of pictures (GOP) within the video elementary stream. GOP's are "entry points" i.e., random access points, at which a decoder can arbitrarily start decoding, e.g., in a trick mode operation (jump, fast forward, rewind, etc.). Such an entry point may also be used by a decoder when it is powered on, or otherwise caused to tune to, a systems layer stream which is already in the middle of transfer. The picture_start_code is required by MPEG-1, MPEG-2 and MPEG-4 (and optional in MPEG-4 part 10) to be present at the start of each encoded video picture. Depending on the type of stream processing, this start code will also be present in the video elementary stream after stream processing. Also, this start code is synchronized to the start of a video picture and therefore coincides with the true decoding time and presentation time of the picture (whether or not DTSs or PTSs representing the decoding time and/or presentation time are present in the systems layer stream). Generally speaking, picture_start_codes will occur at a higher frequency than group_start_codes. The slice_start_code is also a good candidate. The slice_start_code is provided at the beginning of a slice, which (according to MPEG-1 and MPEG-2) includes all or part of the macroblocks of a given macroblock row of a video picture. (According to H.264, a slice can span more than one macroblock row.) The particular macroblock row to which the slice_start_code pertains can be easily determined using a well-defined formula. Therefore, the slice_start_code coincides with the time of presentation of a decoded version of the corresponding slice location in the video picture. Generally speaking, slice_start_codes will occur at a much higher frequency that picture_start_codes. Typically, there will be at least one slice per macroblock row, and a device that parses the elementary stream can determine the particular horizontal offset within the macroblock row at which the slice occurs. Therefore, the correspondence of the slice to the display time of information represented by the slice can be determined.

In some circumstances, it is difficult to choose an actual physical synchronization point that meets all of the above criteria. For example, in transcoding an MPEG-2 video signal to an MPEG-4 video signal, slices may appear in the MPEG-2 video signal but not the MPEG-4 video signal. In the alternative, the physical synchronization points that do appear might not recur at a sufficiently high enough frequency to provide a good reference for retiming or re-synchronizing the ancillary data. For example, picture start codes might not occur frequently enough to provide a sufficiently accurate reference by which ancillary data, such as PCRs, can be resynchronized. In such a case, it may be desirable to choose a virtual synchronization point. Unlike a physical synchronization point, a virtual synchronization point might not correspond to a very explicitly predetermined code or sequence of bits. Rather, a virtual synchronization point might correspond to a bit, or sequence of bits, representing a well-defined, deterministically identifiable layer of the elementary stream, which may start with an arbitrary bit pattern not known ahead of time. For example, MPEG-2 video slices contain individual macroblocks, and each macroblock starts with a variable length code indicating the macroblock address increment. The variable length code representing the macroblock address increment is chosen from a table of multiple macroblock address increment codes. Such a variable length code can be easily identified, but it is not known ahead of time which specific one will be encountered; the specific code encountered will depend on the number of skipped macroblocks between the last encoded macroblock and the current encoded macroblock. Nevertheless, the location of the macroblock in a video picture can be determined with absolute accuracy and therefore so can the corresponding display time of the macroblock. Therefore, the start of a macroblock can provide a very effective virtual synchronization point because, generally, they occur at an even higher frequency than slices.

As stream processing can include any combination of transcoding, editing or splicing, the amount of information in an elementary stream between two successive synchronization points may be changed. For example, in transcoding, the amount of information: (a) in a video picture, between video picture start codes; (b) in a slice, between slice start codes; or (c) in a sequence of one or more macroblocks, between successive macroblock address increment codes, can be changed. Likewise, consider the case of a splice where several video pictures are inserted between two video pictures of an original elementary stream. By definition, the amount of elementary stream information between the picture start code of the original video picture preceding the insert, and the picture start code of the original video picture following the insert, will increase. Nevertheless, the synchronization points will survive the stream processing operation. Moreover, systems layer stream information that was temporally located at a particular vicinity of one synchronization point in the original elementary stream should be temporally located as close as possible to that same synchronization point in the new systems layer stream containing the processed elementary stream.

As can be appreciated from the discussion above, many factors influence the choice of types of synchronization point to be used to retime or re-synchronize the ancillary data. According to one embodiment, the choice of synchronization point type(s) to be used is predetermined and remains fixed during operation. However, it is preferable to adapt the choice of synchronization point type, either once for each elementary stream, or dynamically in real-time, to suit the particular stream processing, types of elementary stream(s) to be processed and types of ancillary data to be retimed or re-synchronized. Illustratively, the choice of synchronization type may be chosen by an operator or automatically selected by the system according to the invention. Generally, automatic adaptation is not only attractive (to minimize operator training and dependence) but also feasible. The reasons is that the stream processor, and other devices that work with it, must be able to parse the incoming systems layer and elementary streams as well as to format them. It is not too much effort to also provide circuitry or software instructions which can determine the relative frequencies of occurrence of different types of ancillary data, synchronization points, etc. to facilitate automatic selection of synchronization point type(s). Note also that more than one type of synchronization point type may be used simultaneously; the synchronization point types need only occur serially in the elementary stream. In addition, it is sometimes desirable to use both physical synchronization points, such as start codes, and virtual synchronization points, such as the points in the bit stream corresponding to macroblocks, simultaneously. This would ensure that synchronization points occur in the bit stream with a sufficiently high frequency of occurrence and regularity.

The above discussion is intended to be merely illustrative of the invention. Those having ordinary skill in the art may devise numerous alternative embodiments of the methods and systems described above without departing from the spirit and scope of the following claims.

What is claimed is:

1. A method of processing a series of original elementary stream segments within an original systems stream to produce a modified systems stream, the original elementary stream segments to be processed belonging to at least one elementary stream, the method comprising the steps of:

receiving, at an interface, an original systems stream comprising a series of systems stream segments, each systems stream segment comprising a systems layer specific segment of information and, for system stream segments that are to carry elementary stream data, further comprising one elementary stream segment of a series of original elementary stream segments to be processed, a plurality of the system layer specific segments comprising a first series of program clock reference times, wherein said original systems stream is a stream of information at a layer above the elementary stream;

recording an arrival time and a segment count of each systems stream segment of the original systems stream;

identifying a plurality of synchronization points within the series of original elementary stream segments in an elementary stream to be processed, wherein the synchronization points are a type of sequential location of the elementary stream which recurs continually throughout the elementary stream, is synchronized in time to a systems time clock of the elementary stream, and is present in the elementary stream both prior to and after processing, the synchronization points including first and second synchronization points that are separated by a particular sequence of information in the elementary stream;

calculating a second series of program clock reference times for the plurality of synchronization points;

processing, using a processor, the series of original elementary stream segments to produce a modified series of elementary stream segments to be carried between the plurality of synchronization points, said modified series of elementary stream segments having a different amount of information than the series of original elementary stream segments;

inserting the modified series of elementary stream segments into a series of new system stream segments that include the calculated second series of program clock reference times for the plurality of synchronization points;

calculating a new arrival time for each of the new system stream segments based on the arrival times and segment counts of each systems stream segment in the original systems stream to account for the modified series of elementary stream segments having a different amount of information than the series of original elementary stream segments, wherein each calculated new arrival time represents an estimated time at which the corresponding new system stream segment would have been expected to arrive if received at said receiving step; and using said calculated new arrival time for each of the new system stream segments for determining a departure time for retransmitting said new system stream segments.

2. The method of claim 1, wherein each of the synchronization points is located between two successive program clock reference times of the first series of program clock reference times, and wherein the second series of program clock reference times are calculated according to an equation as follows:

$$PCR_{SYNC} = PCR_1 + (PCR_2 - PCR_1) * BC_{SYNC}/(B_{PCR2} - B_{PCR1}),$$

wherein $PCR_1$ and $PCR_2$ are values of the two successive program clock reference times in the first series of program clock reference times for a particular synchronization point of the synchronization points, wherein $B_{PCR1}$ and $B_{PCR2}$ represent a location by byte in the original systems stream of the values $PCR_1$ and $PCR_2$, respectively, counting from a first byte of the original systems stream, and wherein $BC_{SYNC}$ represents a location by byte of the particular synchronization point relative to $B_{PCR1}$.

3. The method of claim 1, further comprising:
buffering system stream segments comprising any elementary stream segments in the original systems stream that are not to be processed while said processing step is performed on other elementary stream segments, and
re-multiplexing processed and unprocessed system stream segments in accordance with said original arrival times for unmodified system stream segments and in accordance with said newly-calculated arrival times for said new system stream segments.

4. The method of claim 1, wherein each of said system stream segments in the original systems stream has an identifier, wherein said systems stream segments comprises said elementary system segments belonging to a particular elementary stream being identified by the same identifier, and wherein said first series of program clock references are included in a PCR systems stream segment not comprising one of said elementary stream segments and identified by an identifier unique to said PCR system stream segments, said method further comprising:
changing said unique identifier for said PCR system stream segments to one of said identifiers for one of said elementary streams to be processed; and
forwarding said PCR system stream segments for processing with said one of said elementary streams.

5. The method of claim 1, wherein the series of original elementary stream segments contains an intervening segment with no synchronization point between the first and second synchronization points.

6. The method of claim 1, wherein the modified series of elementary stream segments comprises an elementary stream segment containing the first synchronization point, an intervening elementary-stream segment with no synchronization point in a systems stream segment, and an elementary stream segment containing the subsequent synchronization point, wherein interpolation is used to calculate an arrival time for the systems stream segment comprising the intervening elementary stream segment with no synchronization point.

7. The method of claim 1, wherein the arrival time for the first synchronization point is calculated based on the arrival time of the systems stream segment comprising the elementary stream segment containing the first synchronization point and the position of the synchronization point within the elementary-stream segment containing-the synchronization point relative to the start of the elementary stream segment.

8. The method of claim 1, wherein the calculation of a new arrival time for each new system stream segment is further based on the ratio of the number of bits in a plurality of original elementary stream segments to the number of bits in a plurality of new elementary stream segments.

9. A content-modifying system for modifying a series of original elementary stream segments within an original systems stream to produce a modified systems stream, the original elementary stream segments to be processed belonging to at least one elementary stream, the system comprising:
a system input for receiving an original systems stream comprising a series of systems stream segments, each systems stream segment comprising a systems layer specific segment of information and, for system stream segments that are to carry elementary stream data, further comprising one elementary stream segment of a series of original elementary stream segments to be processed, a plurality of the system layer specific segments comprising a first series of program clock reference times, wherein said original systems stream is a stream of information at a layer above the elementary stream;
a de-multiplexer for separating out one or more elementary streams to be processed from any elementary streams in the original systems stream that are not to be processed;
at least one processor for recording an arrival time and a segment count of each received systems stream segment of the original systems stream and for separately processing at least one of the one or more elementary streams to be processed, the at least one processor
identifying a plurality of synchronization points within the series of original elementary stream segments in an elementary stream to be processed, wherein the synchronization points are a type of sequential location of the elementary stream which recurs continually throughout the elementary stream, is synchronized in time to a systems time clock of the elementary stream, and is present in the elementary stream both prior to and after the processing, the synchronization points including first and second synchronization points that are separated by a particular sequence of information in the elementary stream;
calculating a second series of program clock reference times for the plurality of synchronization points;
processing the series of original elementary stream segments to produce a modified series of elementary stream segments to be carried between the plurality of synchronization points, said modified series of elementary stream segments having a different amount of information than the series of original elementary stream segments;
inserting the modified series of elementary stream segments into a series of new system stream segments that include the calculated second series of program clock reference times for the plurality of synchronization points;
calculating a new arrival time for each of the new system stream segments based on the arrival times and segment counts of each systems stream segment in the original systems stream to account for the modified series of elementary stream segments having a different amount of information than the series of original elementary stream segments, wherein each calculated new arrival time represents an estimated time at which the corresponding new system stream segment would have been expected to arrive if received at said system input for receiving said original systems stream; and using said calculated new arrival time for each of the new system stream segments for determining a departure time for retransmitting said new system stream segments.

10. The system of claim 9, wherein each of said system stream segments in the original systems stream has an identifier, wherein said systems stream segments comprises said elementary system segments belonging to a particular elementary stream being identified by the same identifier, wherein said first series of program clock references are included in a PCR systems stream segment not comprising one of said elementary stream segments and identified by an identifier unique to said PCR system stream segments, and wherein the at least one processor is operable to change said unique identifier for said PCR system stream segments to one of said identifiers for one of said elementary streams to be processed; and forward said PCR system stream segments for processing with said one of said elementary streams.

11. The system of claim 9, wherein the series of original elementary stream segments contains an intervening elementary stream segment with no synchronization point between the first and second synchronization points.

12. The system of claim 9, wherein the modified series of elementary stream segments comprises an elementary stream segment containing the first synchronization point, an intervening elementary-stream segment with no synchronization point in a systems stream segment, and an elementary stream segment containing the subsequent synchronization point, and wherein the at least one processor is operable to use interpolation to calculate an arrival time for the systems stream segment comprising the intervening elementary stream segment with no synchronization point.

13. The system of claim 9, wherein the at least one processor is operable to calculate the arrival time for the first synchronization point based on the arrival time of the segment containing the first synchronization point and the position of the synchronization point within the segment containing the synchronization point relative to the start of the segment.

14. The system of claim 9, wherein the at least one processor which is operable to calculate a new arrival time for each new system stream segment is operable to calculate the new arrival time further based on the ratio of the number of bits in a plurality of original elementary stream segments to the number of bits in a plurality of new elementary stream segments.

15. The system of claim 9, wherein each of the synchronization points is located between two successive program clock reference times of the first series of program clock reference times, and wherein the at least one processor is operable to calculate the second series of program clock reference times according to an equation as follows:

$$PCR_{SYNC}=PCR_1+(PCR_2-PCR_1)*BC_{SYNC}/(B_{PCR2}-B_{PCR1}),$$

wherein $PCR_1$ and $PCR_2$ are values of the two successive program clock reference times in the first series of program clock reference times for a particular synchronization point of the synchronization points, wherein $B_{PCR1}$ and $B_{PCR2}$ represent a location by byte in the original systems stream of the values $PCR_1$ and $PCR_2$, respectively, counting from a first byte of the original systems stream, and wherein $BC_{SYNC}$ represents a location by byte of the particular synchronization point relative to $B_{PCR1}$.

16. The system of claim 9, further comprising:

a buffer for buffering system stream segments comprising any elementary stream information that is not to be processed while said processing step is performed on other elementary stream information, and a re-multiplexer for re-multiplexing processed and unprocessed system stream segments in accordance with said original arrival times for unmodified system stream segments and in accordance with said newly-calculated arrival times for said new system stream segments.

* * * * *

UNITED STATES PATENT AND TRADEMARK OFFICE
CERTIFICATE OF CORRECTION

PATENT NO. : 7,693,222 B2 Page 1 of 1
APPLICATION NO. : 10/640871
DATED : April 6, 2010
INVENTOR(S) : Balakrishnan et al.

It is certified that error appears in the above-identified patent and that said Letters Patent is hereby corrected as shown below:

In Column 14, Line 18, delete "$SNYC_x$," and insert -- $SYNC_x$, --, therefor.

In Column 14, Line 19, delete "$SNYC_x$," and insert -- $SYNC_x$, --, therefor.

In Column 14, Line 28, delete "$\theta_{SYNC}$," and insert -- $\eta_{SYNC}$, --, therefor.

Signed and Sealed this

Sixth Day of July, 2010

David J. Kappos
*Director of the United States Patent and Trademark Office*